United States Patent
He et al.

(10) Patent No.: US 11,677,101 B2
(45) Date of Patent: Jun. 13, 2023

(54) HIGH-ELASTICITY POLYMER FOR LITHIUM METAL PROTECTION, LITHIUM SECONDARY BATTERY AND MANUFACTURING METHOD

(71) Applicant: Global Graphene Group, Inc., Dayton, OH (US)

(72) Inventors: Hui He, Dayton, OH (US); Lu Zhang, Oakwood, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 164 days.

(21) Appl. No.: 17/147,180

(22) Filed: Jan. 12, 2021

(65) Prior Publication Data

US 2022/0223926 A1 Jul. 14, 2022

(51) Int. Cl.

| | |
|---|---|
| H01M 10/42 | (2006.01) |
| H01M 10/0525 | (2010.01) |
| H01M 10/0562 | (2010.01) |
| H01M 10/0566 | (2010.01) |
| H01M 50/42 | (2021.01) |
| H01M 50/414 | (2021.01) |
| H01M 4/62 | (2006.01) |
| H01M 4/131 | (2010.01) |
| H01M 4/485 | (2010.01) |
| H01M 4/134 | (2010.01) |
| H01M 4/38 | (2006.01) |
| H01M 4/525 | (2010.01) |
| H01M 4/505 | (2010.01) |
| H01M 10/052 | (2010.01) |

(52) U.S. Cl.
CPC ....... *H01M 10/4235* (2013.01); *H01M 4/131* (2013.01); *H01M 4/134* (2013.01); *H01M 4/382* (2013.01); *H01M 4/485* (2013.01); *H01M 4/505* (2013.01); *H01M 4/525* (2013.01); *H01M 4/622* (2013.01); *H01M 10/052* (2013.01); *H01M 10/0525* (2013.01); *H01M 10/0562* (2013.01); *H01M 10/0566* (2013.01); *H01M 50/414* (2021.01); *H01M 50/42* (2021.01); *H01M 2300/0037* (2013.01); *H01M 2300/0068* (2013.01); *H01M 2300/0071* (2013.01)

(58) Field of Classification Search
None
See application file for complete search history.

(56) References Cited

U.S. PATENT DOCUMENTS

| | | |
|---|---|---|
| 5,434,021 A | 7/1995 | Fauteux et al. |
| 5,536,599 A | 7/1996 | Alamgir et al. |
| 5,648,187 A | 7/1997 | Skotheim |
| 5,961,672 A | 10/1999 | Skotheim et al. |
| 6,025,094 A | 2/2000 | Visco et al. |
| 6,068,619 A | 5/2000 | Hamajima et al. |
| 6,733,924 B1 | 5/2004 | Skotheim et al. |
| 6,797,428 B1 | 9/2004 | Skotheim et al. |
| 6,936,381 B2 | 8/2005 | Skotheim et al. |
| 7,247,408 B2 | 7/2007 | Skotheim et al. |
| 7,282,295 B2 | 10/2007 | Visco et al. |
| 7,282,296 B2 | 10/2007 | Visco et al. |
| 7,282,302 B2 | 10/2007 | Visco et al. |
| 10,862,129 B2 * | 12/2020 | Pan ...................... H01M 4/134 |
| 2005/0191557 A1 | 9/2005 | Cheiky et al. |
| 2007/0059600 A1 | 3/2007 | Kim et al. |
| 2013/0052544 A1 | 2/2013 | Ohkubo et al. |
| 2016/0181585 A1 | 6/2016 | Choi et al. |
| 2018/0301707 A1 | 10/2018 | Pan et al. |
| 2019/0348682 A1 | 11/2019 | He et al. |
| 2019/0372148 A1 | 12/2019 | He et al. |
| 2019/0386342 A1 | 12/2019 | He et al. |
| 2021/0098791 A1 * | 4/2021 | Yoon ...................... H01M 4/505 |

FOREIGN PATENT DOCUMENTS

| | | |
|---|---|---|
| CN | 111916661 | 11/2020 |
| KR | 1020190024761 | 3/2019 |
| KR | 1020200004755 | 1/2020 |

(Continued)

OTHER PUBLICATIONS

Tavorite, available online at https://www.mindat.org/min-3896.html, date unknown.*
LLZO, available online at https://en.wikipedia.org/wiki/LLZO, date unknown.*
U.S. Appl. No. 15/954,046 Nonfinal Office Action dated Nov. 20, 2020, 10 pages.
U.S. Appl. No. 16/166,536 Final Office Action dated Nov. 18, 2020, 7 pages.
U.S. Appl. No. 16/256,346 Final Office Action dated Dec. 8, 2020, 18 pages.

(Continued)

*Primary Examiner* — Anca Eoff

(57) ABSTRACT

A lithium secondary battery comprising a cathode, an anode, and an elastic polymer protective layer disposed between the cathode and the anode, and a working electrolyte, wherein the elastic polymer protective layer comprises a high-elasticity polymer having a thickness from 50 nm to 100 μm, a lithium ion conductivity from $10^{-8}$ S/cm to $5\times10^{-2}$ S/cm at room temperature, and a fully recoverable tensile elastic strain from 2% to 1,000% when measured without any additive or filler dispersed therein and wherein the high-elasticity polymer comprises a crosslinked polymer network of chains derived from at least one multi-functional monomer or oligomer selected from an acrylate, polyether, polyurethane acrylate, tetraethylene glycol diacrylate, triethylene glycol dimethacrylate, or di(trimethylolpropane) tetraacrylate, wherein a multi-functional monomer or oligomer comprises at least three reactive functional groups.

29 Claims, 4 Drawing Sheets

(56) References Cited

FOREIGN PATENT DOCUMENTS

| WO | 2018156329 A1 | | 8/2018 |
| WO | WO 2020/009435 | * | 1/2020 |

OTHER PUBLICATIONS

International Patent No. PCT/US2022/070147; International Search Report; 3 pages.
U.S. Appl. No. 17/129,127; Non-Final Office Action dated Jun. 24, 2022; 26 pages.

* cited by examiner

Flame retardant additive uniformly distributed in an elastic, ion-conducting polymer matrix High flame retardant additive concentration at one side of an elastic, ion-conducting polymer and flame retardant composite separator This side has a low concentration of flame retardant additive

HIGH-ELASTICITY POLYMER FOR LITHIUM METAL PROTECTION, LITHIUM SECONDARY BATTERY AND MANUFACTURING METHOD

FIELD

The present disclosure relates to the field of rechargeable lithium battery, including the lithium-ion battery and the lithium metal battery (a secondary battery that makes use of lithium metal as an anode active material) and a method of manufacturing same.

BACKGROUND

Lithium-ion and lithium (Li) metal cells (including Lithium-sulfur cell, Li-air cell, etc.) are considered promising power sources for electric vehicle (EV), hybrid electric vehicle (HEV), and portable electronic devices, such as lap-top computers and mobile phones. Lithium metal has the highest capacity (3,861 mAh/g) compared to any other metal or metal-intercalated compound (except $Li_{4.4}Si$) as an anode active material. Hence, in general, rechargeable Li metal batteries have a significantly higher energy density than lithium-ion batteries.

Historically, rechargeable lithium metal batteries were produced using non-lithiated compounds having high specific capacities, such as $TiS_2$, $MoS_2$, $MnO_2$, $CoO_2$ and $V_2O_5$, as the cathode active materials, which were coupled with a lithium metal anode. When the battery was discharged, lithium ions were dissolved from the lithium metal anode and transferred to the cathode through the electrolyte and, thus, the cathode became lithiated. Unfortunately, upon cycling, the lithium metal resulted in the formation of dendrites that ultimately caused unsafe conditions in the battery. As a result, the production of these types of secondary batteries was stopped in the early 1990's giving ways to lithium-ion batteries.

Even now, cycling stability and safety concerns remain the primary factors preventing the further commercialization of Li metal batteries for EV, HEV, and microelectronic device applications. These issues are primarily due to the high tendency for Li to form dendrite structures during repeated charge-discharge cycles or an overcharge, leading to internal electrical shorting and thermal runaway. Many attempts have been made to address the dendrite-related issues, as briefly summarized below:

Fauteux, et al. [D. Fauteux, et al., "Secondary Electrolytic Cell and Electrolytic Process," U.S. Pat. No. 5,434,021, Jul. 18, 1995] applied to a metal anode a protective surface layer (e.g., a mixture of polynuclear aromatic and polyethylene oxide) that enables transfer of metal ions from the metal anode to the electrolyte and back. The surface layer is also electronically conductive so that the ions will be uniformly attracted back onto the metal anode during electrodeposition (i.e. during battery recharge). Alamgir, et al. [M. Alamgir, et al. "Solid polymer electrolyte batteries containing metallocenes," U.S. Pat. No. 5,536,599, Jul. 16, 1996] used ferrocenes to prevent chemical overcharge and dendrite formation in a solid polymer electrolyte-based rechargeable battery.

Skotheim [T. A. Skotheim, "Stabilized Anode for Lithium-Polymer Battery," U.S. Pat. No. 5,648,187 (Jul. 15, 1997); U.S. Pat. No. 5,961,672 (Oct. 5, 1999)] provided a Li metal anode that was stabilized against the dendrite formation by the use of a vacuum-evaporated thin film of a Li ion-conducting polymer interposed between the Li metal anode and the electrolyte. Skotheim, et al. [T. A. Skotheim, et al. "Lithium Anodes for Electrochemical Cells," U.S. Pat. No. 6,733,924 (May 11, 2004); U.S. Pat. No. 6,797,428 (Sep. 28, 2004); U.S. Pat. No. 6,936,381 (Aug. 30, 2005); and U.S. Pat. No. 7,247,408 (Jul. 24, 2007)] further proposed a multilayer anode structure consisting of a Li metal-based first layer, a second layer of a temporary protective metal (e.g., Cu, Mg, and Al), and a third layer that is composed of at least one layer (typically 2 or more layers) of a single ion-conducting glass, such as lithium silicate and lithium phosphate, or polymer. It is clear that such an anode structure, consisting of at least 3 or 4 layers, is too complex and too costly to make and use.

Protective coatings for Li anodes, such as glassy surface layers of LiI— $Li_3PO_4$—$P_2S_5$, may be obtained from plasma assisted deposition [S. J. Visco, et al., "Protective Coatings for Negative Electrodes," U.S. Pat. No. 6,025,094 (Feb. 15, 2000)]. Complex, multi-layer protective coatings were also proposed by Visco, et al. [S. J. Visco, et al., "Protected Active Metal Electrode and Battery Cell Structures with Non-aqueous Interlayer Architecture," U.S. Pat. No. 7,282,295 (Oct. 16, 2007); U.S. Pat. No. 7,282,296 (Oct. 16, 2007); and U.S. Pat. No. 7,282,302 (Oct. 16, 2007)].

Despite these earlier efforts, no rechargeable Li metal batteries have yet succeeded in the marketplace. This is likely due to the notion that these prior art approaches still have major deficiencies. For instance, in several cases, the anode or electrolyte structures are too complex. In others, the materials are too costly or the processes for making these materials are too laborious or difficult. Solid electrolytes typically have a low lithium ion conductivity, are difficult to produce and difficult to implement into a battery.

Furthermore, solid electrolyte, as the sole electrolyte in a cell or as an anode-protecting layer (interposed between the lithium film and another electrolyte) does not have or maintain a good contact with the lithium metal. This significantly reduces the effectiveness of the electrolyte to support dissolution of lithium ions (during battery discharge), transport lithium ions, and allowing the lithium ions to re-deposit back to the lithium anode (during battery recharge). A ceramic separator that is disposed between an anode active material layer (e.g. a graphite-based anode layer or a lithium metal layer) and a cathode active layer suffers from the same problems as well. In addition, a ceramic separator also has a poor contact with the cathode layer if the electrolyte in the cathode layer is a solid electrolyte (e.g., inorganic solid electrolyte).

Another major issue associated with the lithium metal anode is the continuing reactions between electrolyte and lithium metal, leading to repeated formation of "dead lithium-containing species" that cannot be re-deposited back to the anode and become isolated from the anode. These reactions continue to irreversibly consume electrolyte and lithium metal, resulting in rapid capacity decay. In order to compensate for this continuing loss of lithium metal, an excessive amount of lithium metal (3-5 times higher amount than what would be required) is typically implemented at the anode when the battery is made. This adds not only costs but also a significant weight and volume to a battery, reducing the energy density of the battery cell. This important issue has been largely ignored and there has been no plausible solution to this problem in battery industry.

Clearly, an urgent need exists for a simpler, more cost-effective, and easier to implement approach to preventing Li metal dendrite-induced internal short circuit and thermal runaway problems in Li metal batteries, and to reducing or eliminating the detrimental reactions between lithium metal and the electrolyte.

Hence, an object of the present disclosure was to provide a multi-functional separator or an anode-protecting layer to overcome the lithium metal dendrite formation and penetration problems and to prevent continuous electrolyte-lithium reactions in all types of Li metal batteries having a lithium metal anode. A specific object of the present disclosure was to provide a lithium metal cell or a lithium-ion cell that exhibits a safe, high specific capacity, high specific energy, high degree of safety, and a long and stable cycle life.

SUMMARY

The present disclosure provides a lithium secondary battery comprising a cathode, an anode, an elastic, ion-conducting polymer layer (herein referred to as an "elastic polymer protective layer," acting as an anode-protecting layer and/or a separator (or ion-conducting membrane) disposed between the cathode and the anode, and a working electrolyte through which lithium ions are transported between the anode and the cathode during the battery charging or discharging step, wherein the elastic and ion-conducting polymer layer comprises a high-elasticity polymer having a thickness from 2 nm to 100 μm (preferably from 10 nm to 20 μm), a lithium ion conductivity from $10^{-8}$ S/cm to $5 \times 10^{-2}$ S/cm at room temperature, and a fully recoverable elastic tensile strain from 2% to 1,000% (preferably greater than 10% and further preferably from 30% to 300%) when measured without any additive dispersed therein. The high-elasticity polymer comprises at least a crosslinked polymer network of chains derived from at least one multi-functional monomer or oligomer selected from an acrylate, polyether, polyurethane acrylate, tetraethylene glycol diacrylate, triethylene glycol dimethacrylate, di(trimethylolpropane) tetraacrylate, or a derivative thereof, wherein a multi-functional monomer or oligomer comprises at least three reactive functional groups wherein the crosslinked polymer network of chains is impregnated with from 0% to 90% by weight of a liquid electrolyte.

The optional liquid electrolyte typically comprises a lithium salt dissolved in a non-aqueous solvent (e.g., an organic liquid solvent or an ionic liquid). The lithium salt concentration in the liquid electrolyte solution may be from 0.1 M to 20 M, preferably greater than 1.5 M, more preferably greater than 2.0 M, further more preferably greater than 3.0 M. The total liquid solvent proportion in the elastic polymer protective layer is preferably less than 90% by weight, more preferably less than 50%, further preferably less than 20%, still more preferably less than 10% and most preferably less than 5% by weight.

Preferably, the high-elasticity polymer comprises chains selected from 3-methoxysilyl-terminated polypropylene glycol, pendant poly(ethylene oxide) (PEO) segments, an amine-based compound comprising polyethylene glycol as a functional group, polyethylene glycol having two or more epoxy groups, poly(ethylene glycol) methyl ether acrylate (PEGA), (2-(3-(6-methyl-4-oxo-1,4-dihydropyrimidin-2-yl)ureido)ethyl methacrylate) (UPyMA), poly[propylene oxide-co-2-(2-methoxyethoxy)ethyl glycidyl ether] (P(PO/EM), poly(2-hydroxyethyl acrylate), poly(dopamine methacrylate), poly(2-hydroxyethyl acrylate-co-dopamine methacrylate) (P(HEA-co-DMA), or a combination thereof.

In some embodiment, the battery is a lithium metal battery meeting one of the three criteria: (i) the anode has an anode current collector but initially the anode has no lithium or lithium alloy as an anode active material supported by the anode current collector when the battery is made and prior to a charge or discharge operation of the battery; (ii) the high-elasticity polymer layer serves as a separator and there is no additional separator in the battery (other than the elastic polymer protective layer); or (iii) the high-elasticity polymer further comprises a desired amount of a flame-retardant additive or particles of an inorganic solid electrolyte.

In a typical configuration, this elastic polymer protective layer is in ionic contact with both the anode and the cathode and typically in physical contact with an anode active material layer (or an anode current collector) and with a cathode active material layer.

With this multi-functional elastic polymer protective layer, there is no need to have a separate or additional separator or anode-protecting layer in the battery cell. This multi-functional layer serves not only as a separator that electrically isolates the anode from the cathode but also a lithium metal protection layer (in the cases where lithium metal is the primary anode active material). This layer is elastic, enabling good ionic contact between an anode active layer (or anode current collector) and a separator layer and/or good ionic contact between a separator layer and a cathode active layer, thereby significantly reducing the interfacial impedance.

Alternatively, the lithium secondary battery may further comprise an ion-conducting and electrically insulating separator disposed between the elastic polymer protective layer and the cathode. This separator can be selected from a polymer, ceramic, fibrous, glass, or composite type ion permeable membrane.

In certain embodiments, the anode in the lithium secondary battery has an amount of lithium or lithium alloy as an anode active material supported by an anode current collector.

In certain other embodiments, initially the anode has no lithium or lithium alloy as an anode active material supported by the anode current collector when the battery is made and prior to a charge or discharge operation of the battery. The needed lithium ions are pre-stored in the cathode active material when the battery is made. This configuration is referred to as an anode-less lithium battery.

In certain embodiments, the battery is a lithium-ion battery and the anode has an anode current collector and a layer of an anode active material supported by the anode current collector, which is in physical contact with the elastic flame-retardant composite separator. The anode active materials is selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobium oxide, lithium-containing titanium oxide, lithium transition metal oxide, $ZnCo_2O_4$; (f) carbon or graphite particles (g) prelithiated versions thereof; and (h) combinations thereof.

The anode current collector may be selected from, for instance, a Cu foil, a Cu-coated polymer film, a sheet of Ni foam, a porous layer of nano-filaments, such as graphene sheets, carbon nanofibers, carbon nano-tubes, etc.

In some embodiments, the cathode comprises particles of a cathode active material and a conductive additive that are dispersed in or bonded by a high-elasticity polymer, which serves as a solid-state electrolyte. This high-elasticity polymer electrolyte in the cathode may comprise at least a crosslinked polymer network of chains derived from at least one multi-functional monomer or oligomer selected from an acrylate, polyether, polyurethane acrylate, tetraethylene glycol diacrylate, triethylene glycol dimethacrylate, or di(trimethylolpropane) tetraacrylate, wherein a multi-functional monomer or oligomer comprises at least three reactive functional groups. In some preferred embodiment, the solid-state polymer electrolyte in the cathode comprises chains selected from 3-methoxysilyl-terminated polypropylene glycol, pendant poly(ethylene oxide) (PEO) segments, poly(ethylene glycol) methyl ether acrylate (PEGA), (2-(3-(6-methyl-4-oxo-1,4-dihydropyrimidin-2-yl)ureido)ethyl methacrylate) (UPyMA), poly[propylene oxide-co-2-(2-methoxyethoxy)ethyl glycidyl ether] (P(PO/EM), poly(2-hydroxyethyl acrylate), poly(dopamine methacrylate), poly(2-hydroxyethyl acrylate-co-dopamine methacrylate) (P(HEA-co-DMA), or a combination thereof. The same solid-state polymer electrolyte may be used in the anode of a lithium-ion battery as well.

This elastic protective polymer layer may also act to provide flame-retardant or fire-resisting capability to the battery if from 0.1% to 95% (preferably greater than 10%, more preferably from 20% to 85%, and most preferably from 30% to 70%) by weight of a flame retardant that is dispersed in, dissolved in, or chemically bonded to the high-elasticity polymer.

Preferably, the flame retardant additive is selected from a halogenated flame retardant, phosphorus-based flame retardant, melamine flame retardant, metal hydroxide flame retardant, silicon-based flame retardant, phosphate flame retardant, biomolecular flame retardant, or a combination thereof.

In certain embodiments, the elastic polymer composite comprises reactive type flame retardant (flame-retardant group becomes part of the polymer chain structure after polymerization or crosslinking), additive type flame retardant (additive simply dispersed in the polymer matrix), or both types. For instance, the elastic polymer composite may comprise a flame retardant chemical group that is bonded to polysiloxane, which is elastic.

In certain embodiments, the flame retardant additive is in a form of encapsulated particles comprising the additive encapsulated by a shell of coating material that is breakable or meltable when exposed to a temperature higher than a threshold temperature (e.g., flame or fire temperature induced by internal shorting). The encapsulating material is a substantially lithium ion-impermeable and liquid electrolyte-impermeable coating material.

In some embodiments, the high-elasticity polymer further comprises from 0.01% to 95% by weight of an inorganic filler dispersed therein. The inorganic filler may be selected from an oxide, carbide, boride, nitride, sulfide, phosphide, halogen compound, or selenide of a transition metal, Al, Ga, In, Sn, Pb, Sb, B, Si, Ge, Sb, or Bi, a lithiated version thereof, or a combination thereof. The transition metal is selected from Ti, V, Cr, Mn, Fe, Co, Ni, Cu, Zn, Y, Zr, Nb, Mo, Pd, Ag, Cd, La, Ta, W, Pt, Au, Hg, a combination thereof.

The inorganic filler may be selected from an inorganic solid electrolyte material in a fine powder form having a particle size from 2 nm to 30 μm. Preferably, the elastic layer further comprises from 1% to 90% by weight of particles of an inorganic solid electrolyte material dispersed therein wherein the particles have a particle size preferably from 10 nm to 30 μm, more preferably from 50 nm to 1 μm.

The inorganic solid electrolyte material may be selected from an oxide type, sulfide type, hydride type, halide type, borate type, phosphate type, lithium phosphorus oxynitride (LiPON), Garnet-type, lithium superionic conductor (LISICON), sodium superionic conductor (NASICON), or a combination thereof.

In the lithium secondary battery, the working electrolyte is selected from an organic liquid electrolyte, ionic liquid electrolyte, polymer gel electrolyte, solid-state electrolyte, quasi-solid electrolyte having a lithium salt dissolved in an organic or ionic liquid with a lithium salt concentration higher than 2.0 M, hybrid or composite electrolyte, or a combination thereof.

A high-elasticity polymer refers to a polymer, typically a lightly cross-linked polymer, which exhibits an elastic deformation that is at least 2% (preferably at least 5%) when measured under uniaxial tension. In the field of materials science and engineering, the "elastic deformation" is defined as a deformation of a material (when being mechanically stressed) that is essentially fully recoverable upon release of the load and the recovery process is essentially instantaneous (no or little time delay). The elastic deformation is more preferably greater than 10%, even more preferably greater than 30%, further more preferably greater than 50%, and still more preferably greater than 100%. The elasticity of the elastic polymer alone (without any additive dispersed therein) can be as high as 1,000%. However, the elasticity can be significantly reduced if a certain amount of inorganic filler is added into the polymer. Depending upon the type and proportion of the solid electrolyte particles incorporated, the reversible elastic deformation is typically reduced to the range of 2%-500%, more typically 2%-300%.

The high-elasticity polymer may comprise an elastomer that forms a mixture, a copolymer, a semi-interpenetrating network, or a simultaneous interpenetrating network with the high-elasticity polymer, wherein the elastomer is selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) elastomer, poly(ethylene-co-butene) elastomer, styrene-ethylene-butadiene-styrene elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polysiloxane, polyurethane, urethane-urea copolymer, urethane-acrylic copolymer, a copolymer thereof, a sulfonated version thereof, or a combination thereof.

The high-elasticity polymer may further comprise from 0.1% to 50% by weight of a lithium ion-conducting additive, which is different from the inorganic solid electrolyte particles.

In certain embodiments, the anode contains a current collector without a lithium metal or any other anode active material, such as graphite or Si particles, when the battery cell is manufactured. Such a battery cell having an initially lithium metal-free anode is commonly referred to as an "anode-less" lithium battery. The lithium ions that are required for shuttling back and forth between the anode and the cathode are initially stored in the cathode active materials (e.g. Li in $LiMn_2O_4$ and $LiMPO_4$, where M=Ni, Co, F, Mn, etc.). During the first battery charge procedure, lithium ions (Lie) come out of the cathode active material, move through the electrolyte and then through the presently disclosed elastic and flame retardant composite separator and get deposited on a surface of the anode current collector. As this charging procedure continues, more lithium ions get deposited onto the current collector surface, eventually forming a lithium metal film or coating. The high-elasticity nature of the disclosed separator may be squeezed when the lithium film increases in thickness.

During the subsequent discharge, this lithium film or coating layer decreases in thickness due to dissolution of lithium into the electrolyte to become lithium ions, possibly creating a gap between the current collector and the protective layer if the separator layer were not elastic. Such a gap would make the re-deposition of lithium ions back to the anode impossible during a subsequent recharge procedure. We have observed that the elastic composite separator is capable of expanding or shrinking congruently or conformably with the anode layer. This capability helps to maintain a good contact between the current collector (or the lithium film itself) and the protective layer, enabling the re-deposition of lithium ions without interruption.

In certain embodiments, the high-elasticity polymer further contains a reinforcement material dispersed therein wherein the reinforcement material is selected from a polymer fiber, a glass fiber, a ceramic fiber or nano-flake (e.g. nano clay flakes), or a combination thereof. The reinforcement material preferably has a thickness or diameter less than 100 nm.

The elastic polymer protective layer may further comprise a lithium salt (as a lithium ion-conducting additive) dispersed in the polymer wherein the lithium salt may be preferably selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato) borate (LiBOB), lithium oxalyldifluoroborate (LiBF$_2$C$_2$O$_4$), lithium nitrate (LiNO$_3$), Li-fluoroethyl-phosphate (LiPF$_3$(CF$_2$CF$_3$)$_3$), lithium bisperfluoro-ethylsulfonylimide (LiBETI), lithium bis(fluorosulfonyl)imide, an ionic liquid-based lithium salt, or a combination thereof.

The elastic polymer protective layer preferably has a lithium ion conductivity no less than $10^{-5}$ S/cm, more preferably no less than $10^{-4}$ S/cm, and most preferably no less than $10^{-3}$ S/cm. Some of the selected polymers exhibit a lithium-ion conductivity greater than $10^{-2}$ S/cm.

In some embodiments, the high-elasticity polymer further comprises a lithium ion-conducting additive dispersed in a high-elasticity polymer matrix material, wherein the lithium ion-conducting additive is selected from Li$_2$CO$_3$, Li$_2$O, Li$_2$C$_2$O$_4$, LiGH, LiX, ROCO$_2$Li, HCOLi, ROLi, (ROCO$_2$Li)$_2$, (CH$_2$OCO$_2$Li)$_2$, Li$_2$S, Li$_x$SO$_y$, or a combination thereof, wherein X=F, Cl, I, or Br, R=a hydrocarbon group, $0<x\le1$, $1\le y\le4$.

In some embodiments, the high-elasticity polymer forms a mixture, blend, semi-IPN, or simultaneous interpenetrating network (SIPN) with a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly (bis(2-(2-methoxyethoxy)ethoxy)phosphazene), Polyvinyl chloride, Polydimethylsiloxane, poly(vinylidene fluoride)-hexafluoropropylene (PVDF-HFP), a sulfonated derivative thereof, or a combination thereof. Sulfonation is herein found to impart improved lithium ion conductivity to a polymer.

The cathode active material may be selected from an inorganic material, an organic material, a polymeric material, or a combination thereof. The inorganic material may be selected from sulfur, selenium, a metal oxide, metal phosphate, metal silicide, metal selenide (e.g. lithium polyselides for use in a Li—Se cell), metal sulfide (e.g. lithium polysulfide for use in a Li—S cell), or a combination thereof. Preferably, these cathode active materials contain lithium in their structures; otherwise the cathode should contain a lithium source.

The inorganic cathode active material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

The cathode active material layer may contain a metal oxide containing vanadium oxide selected from the group consisting of Li$_x$VO$_2$, Li$_x$V$_2$O$_5$, Li$_x$V$_3$O$_8$, Li$_x$V$_3$O$_7$, Li$_x$V$_4$O$_9$, Li$_x$V$_6$O$_{13}$, their doped versions, their derivatives, and combinations thereof, wherein $0.1<x<5$.

The cathode active material layer may contain a metal oxide or metal phosphate, selected from a layered compound LiMO$_2$, spinel compound LiM$_2$O$_4$, olivine compound LiMPO$_4$, silicate compound Li$_2$MSiO$_4$, Tavorite compound LiMPO$_4$F, borate compound LiMBO$_3$, or a combination thereof, wherein M is a transition metal or a mixture of multiple transition metals.

The cathode active material may preferably comprise lithium nickel manganese oxide (LiNi$_a$Mn$_{2-a}$O$_4$, $0<a<2$), lithium nickel manganese cobalt oxide (LiNi$_n$Mn$_m$Co$_{1-n-m}$O$_2$, $0<n<1$, $0<m<1$, $n+m<1$), lithium nickel cobalt aluminum oxide (LiNi$_c$Co$_d$Al$_{1-c-d}$O$_2$, $0<c<1$, $0<d<1$, $c+d<1$), lithium manganate (LiMn$_2$O$_4$), lithium iron phosphate (LiFePO$_4$), lithium manganese oxide (LiMnO$_2$), lithium cobalt oxide (LiCoO$_2$), lithium nickel cobalt oxide (LiNi$_p$Co$_{1-p}$O$_2$, $0<p<1$), or lithium nickel manganese oxide (LiNi$_q$Mn$_{2-q}$O$_4$, $0<q<2$).

The cathode active material is preferably in a form of nano particle (spherical, ellipsoidal, and irregular shape), nano wire, nano fiber, nano tube, nano sheet, nano belt, nano ribbon, nano disc, nano platelet, or nano horn having a thickness or diameter less than 100 nm. These shapes can be collectively referred to as "particles" unless otherwise specified or unless a specific type amount the above species is desired. Further preferably, the cathode active material has a dimension less than 50 nm, even more preferably less than 20 nm, and most preferably less than 10 nm. In some embodiments, one particle or a cluster of particles may be coated with or embraced by a layer of carbon disposed between the particle(s) and/or a high-elasticity polymer layer (an encapsulating shell).

The cathode layer may further contain a graphite, graphene, or carbon material mixed with the cathode active material particles. The carbon or graphite material is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof. Graphene may be selected from pristine graphene, graphene oxide, reduced graphene oxide, graphene fluoride, hydrogenated graphene, nitrogenated graphene, functionalized graphene, etc.

The cathode active material particles may be coated with or embraced by a conductive protective coating, selected from a carbon material, graphene, electronically conductive polymer, conductive metal oxide, or conductive metal coating.

In certain embodiments, the elastic polymer protective layer has two primary surfaces with a first primary surface facing the anode side and a second primary surface opposing or opposite to the first primary surface (facing the cathode side) and wherein the flame-retardant and/or optional solid electrolyte powder has a first concentration at the first surface and a second concentration at the second surface and the first concentration is greater than the second concentration. In other words, there are more flame retardant and/or inorganic particles at anode side of the elastic composite separator layer than the opposite side intended to be facing the cathode. There is a concentration gradient across the thickness of the elastic composite separator layer. The high concentration of the flame retardant and/or inorganic solid electrolyte particles on the anode side (preferably >30% by weight and more preferably >60% by weight) can help stop the penetration of any lithium dendrite, if formed, and help to form a stable artificial solid-electrolyte interphase (SEI). The high concentration of a flame retardant facing the anode side also acts to suppress any internal thermal run-away or fire. Thus, in some embodiments, the elastic composite separator has a gradient concentration of the flame retardant and/or the inorganic solid electrolyte particles across the thickness of the separator.

The present disclosure also provides a process for manufacturing the elastic polymer protective layer, the process comprising (A) dispersing an optional flame retardant additive and/or optional particles of the inorganic solid electrolyte particles in a liquid reactive mass of a precursor to a high-elasticity polymer (a polymer and a crosslinking agent, or a mixture of a monomer/oligomer, an optional catalyst/initiator, and a crosslinking agent) to form a reactive suspension/slurry; (B) dispensing and depositing a layer of the liquid reactive mass or suspension/slurry onto a solid substrate surface; and (C) polymerizing and/or curing (crosslinking) the reactive mass to form a layer of high-elasticity polymer. The high-elasticity polymer comprises at least a crosslinked polymer network of chains derived from at least one multi-functional monomer or oligomer selected from an acrylate, polyether, polyurethane acrylate, tetraethylene glycol diacrylate, triethylene glycol dimethacrylate, or di(trimethylolpropane) tetraacrylate, wherein a multi-functional monomer or oligomer comprises at least three reactive functional groups.

Preferably, the high-elasticity polymer comprises chains selected from 3-methoxysilyl-terminated polypropylene glycol, pendant poly(ethylene oxide) (PEO) segments, poly(ethylene glycol) methyl ether acrylate (PEGA), (2-(3-(6-methyl-4-oxo-1,4-dihydropyrimidin-2-yl)ureido)ethyl methacrylate) (UPyMA), poly[propylene oxide-co-2-(2-methoxyethoxy)ethyl glycidyl ether] (P(PO/EM), poly(2-hydroxyethyl acrylate), poly(dopamine methacrylate), poly(2-hydroxyethyl acrylate-co-dopamine methacrylate) (P(HEA-co-DMA), or a combination thereof.

The solid substrate may be an anode current collector, an anode active material layer, a cathode active material layer, or a solid separator (e.g., a solid ceramic separator). In other words, this elastic polymer protective layer can be directly deposited onto a layer of anode active material, an anode current collector, a layer of cathode active material, or a solid separator. This is achievable because curing of the high-elasticity polymer does not require a high temperature; curing temperature typically lower than 200° C. or even lower than 100° C. This is in stark contrast to the typically 900-1,200° C. required of sintering an inorganic solid electrolyte to form a ceramic separator. In addition, the presently disclosed elastic polymer protective layer is at least as good as a ceramic separator in terms of reducing interfacial impedance and stopping dendrite penetration.

Preferably, the process is a roll-to-roll process wherein step (B) comprises (i) continuously feeding a layer of the solid substrate (e.g. flexible metal film, plastic film, etc.) from a feeder roller to a dispensing zone where the reactive mass is dispensed and deposited onto the solid substrate to form a continuous layer of the reactive mass; (ii) moving the layer of the reactive mass into a reacting zone where the reactive mass is exposed to heat, ultraviolet (UV) light, or high-energy radiation (e.g. electron beam) to polymerize and/or crosslink the reactive mass to form a continuous layer or roll of elastic polymer; and (iii) collecting the elastic polymer on a winding roller. This process is conducted in a reel-to-reel manner.

The process may further comprise unwinding the elastic polymer roll or layer from the winding roller and cutting/trimming the roll (or part of the roll) of elastic polymer into one or multiple pieces of elastic polymer protective layers.

The process may further comprise combining an anode, the elastic polymer protective layer, a working electrolyte, and a cathode electrode to form a lithium battery.

The disclosure also provides an elastic and flame retardant composite layer, wherein the elastic and flame retardant composite comprises a high-elasticity polymer and from 0.1% to 95% by weight of a flame retardant additive dispersed in, dissolved in, or chemically bonded to the high-elasticity polymer, wherein said elastic composite separator has a thickness from 50 nm to 100 μm and a lithium ion conductivity from $10^{-8}$ S/cm to $5 \times 10^{-2}$ S/cm at room temperature and said high elasticity polymer has a fully recoverable tensile strain from 2% to 1,000% when measured without any additive dispersed therein and wherein said high-elasticity polymer comprises at least a crosslinked polymer network of chains derived from at least one multi-functional monomer or oligomer selected from an acrylate, polyether, polyurethane acrylate, tetraethylene glycol diacrylate, triethylene glycol dimethacrylate, or di(trimethylolpropane) tetraacrylate, wherein a multi-functional monomer or oligomer comprises at least three reactive functional groups.

Preferably, the flame retardant additive is in a form of encapsulated particles comprising the additive encapsulated by a shell of coating material that is breakable or meltable when exposed to a temperature higher than a threshold temperature (e.g., flame or fire temperature induced by internal shorting). The encapsulating material is a substantially lithium ion-impermeable and liquid electrolyte-impermeable coating material.

Such an elastic, ion-conducting, and flame-retardant composite may be used as a separator, an anode protection layer, or both for a lithium secondary battery.

Preferably, the high-elasticity polymer composite has a lithium ion conductivity from $1 \times 10^{-5}$ S/cm to $5 \times 10^{-2}$ S/cm. In some embodiments, the high-elasticity polymer composite has a recoverable tensile strain from 10% to 300% (more preferably >30%, and further more preferably >50%).

In certain embodiments, some additive, such as particles of a solid inorganic electrolyte, an elastomer (or its precursor), an ion-conductive polymer, a lithium-ion conducting material, a reinforcement material (e.g. high-strength, non-conducting fibers), or a combination thereof may be added into the reactive mass.

The lithium ion-conducting material is dispersed in the high-elasticity polymer and is preferably selected from $Li_2CO_3$, $Li_2O$, $Li_2C_2O_4$, LiGH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq 1$, $1\leq y\leq 4$.

In some embodiments, the lithium ion-conducting material dispersed in the reactive mass is selected lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li fluoroalkyl phosphate Li-fluoroethyl-phosphate ($LiPF_3(CF_2CF_3)_3$), lithium bisperfluoro-ethylsulfonylimide (LiBETI), lithium bis(trifluoromethanesulfonyl)imide, lithium bis (fluorosulfonyl)imide, lithium trifluoromethanesulfonimide (LiTFSI), an ionic liquid-based lithium salt, or a combination thereof.

If desired, the resulting elastic polymer protective layer may be soaked in or impregnated with an organic or ionic liquid electrolyte.

DETAILED DESCRIPTION

Figure 1:
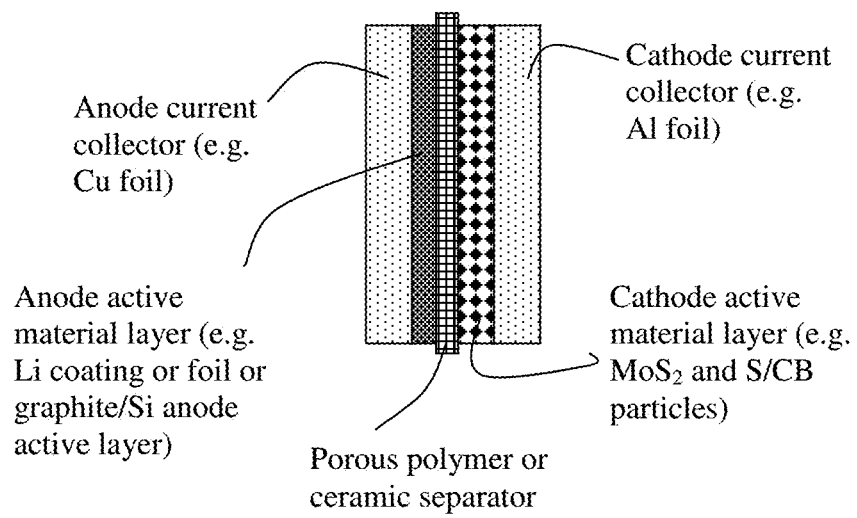
FIG. 1 Schematic of a prior art lithium metal battery cell, containing an anode layer (a thin Li foil or Li coating deposited on a surface of a current collector, Cu foil), a porous separator, and a cathode active material layer, which is composed of particles of a cathode active material, a conductive additive (not shown) and a resin binder (not shown). A cathode current collector supporting the cathode active layer is also shown.

This disclosure is related to a lithium secondary battery, wherein the working electrolyte is preferably based on an organic electrolyte, a polymer gel electrolyte, an ionic liquid electrolyte, a quasi-solid electrolyte, or a solid-state electrolyte. The shape of a lithium secondary battery can be cylindrical, square, button-like, etc. The present disclosure is not limited to any battery shape or configuration or any type of electrolyte.

The present disclosure provides a lithium secondary battery comprising a cathode, an anode, and an elastic polymer protective layer disposed between the cathode and the anode, and a working electrolyte through which lithium ions are transported between the anode and the cathode during a battery charge or discharge, wherein the elastic polymer protective layer comprises a high-elasticity polymer having a thickness from 2 nm to 100 µm (preferably 5-100 nm if used as an anode-protecting layer; or preferably from 1 to 20 µm if used as a separator), a lithium ion conductivity from $10^{-8}$ S/cm to $5\times 10^{-2}$ S/cm at room temperature, and a fully recoverable tensile elastic strain from 2% to 1,000% (preferably greater than 10% and further preferably from 30% to 300%) when measured without any additive dispersed therein. The high-elasticity polymer comprises at least a crosslinked polymer network of chains derived from at least one multi-functional monomer or oligomer selected from an acrylate, polyether, polyurethane acrylate, tetraethylene glycol diacrylate, triethylene glycol dimethacrylate, di(trimethylolpropane) tetraacrylate, a derivative thereof, or a combination thereof, wherein a multi-functional monomer or oligomer comprises at least three reactive functional groups that are capable of forming chemical bonds with three molecules or chemical species. Chemical bonds herein refer to covalent bonds, ionic bonds, and/or hydrogen bonds. The high-elasticity polymer may comprise a cross-linked network of polymer chains crosslinked by a curing/crosslinking agent to a degree of crosslinking that imparts an elastic tensile strain preferably from 5% to 500%.

A high-elasticity polymer may comprise an electrolyte solvent (e.g., an organic solvent or ionic liquid), a lithium salt, or both that are dispersed in the polymer chain network (impregnated into or trapped in the polymer chain network). The liquid electrolyte (lithium salt dissolved in a non-aqueous solvent) is preferably from 1% to 95% by weight, preferably from 5% to 50%, based on the total weight of polymer, liquid solvent, and lithium salt combined. The liquid content is further preferably less than 20% and most preferably less than 5%.

Preferably, the high-elasticity polymer comprises chains selected from 3-methoxysilyl-terminated polypropylene glycol, pendant poly(ethylene oxide) (PEO) segments, an amine-based compound comprising polyethylene glycol as a functional group, polyethylene glycol having two or more epoxy groups, poly(ethylene glycol) methyl ether acrylate (PEGA), (2-(3-(6-methyl-4-oxo-1,4-dihydropyrimidin-2-yl) ureido)ethyl methacrylate) (UPyMA), poly[propylene oxide-co-2-(2-methoxyethoxy)ethyl glycidyl ether] (P(PO/EM), poly(2-hydroxyethyl acrylate), poly(dopamine methacrylate), poly(2-hydroxyethyl acrylate-co-dopamine methacrylate) (P(HEA-co-DMA), or a combination thereof.

Multi-functional monomers or oligomers of an acrylate or a derivative thereof may be selected from acrylamide, methacrylamide, isooctyl acrylate monomer, dodecyl acrylate, dodecyl gallate, hydroxy-ethyl acrylate, hydroxyethyl methacrylate, methyl methacrylate, butyl methacrylate, hexyl methacrylate, 2-cyclohexyl methacrylate, methacrylic acid macrogol ester, N,N-DMAA, methyl acrylate, ethyl acrylate, butyl acrylate, hexyl 2-propenoate, 2-cyclohexyl acrylate, N-acryloyl morpholine, polyalkylene glycol acrylate ester, ethylene glycol diacrylate polyethyleneglycol diacrylate, neopentylglycol diacrylate, 1,6-hexanediyl ester, tetraethylene glycol diacrylate, tri (propylene glycol) diacrylate, ethoxyquin trimethylol menthane tetraacrylate, tri-tetramethylol methane tetraacrylate, 2-Glycerin tetraacrylate, pentaerythritol triacrylate, trimethylolpropane triacrylate, glycerol propoxylate triacrylate, tris(2-ethoxy) isocyanuric acid triacrylate, propoxylated trimethylolpropane triacrylate, ethoxylated trimethylolpropane triacrylate, tetramethylol methane tetraacrylate, Ethylene glycol dimethacrylate, polyethylene glycol dimethacrylate, neopentylglycol dimethacrylate, tetraethylene glycol dimethacrylate, tripropylene glycol dimethylacrylate, ethoxyquin pentaerythritol tetramethylacrylate, pentaerythritol tetramethylacrylate, 2-Glycerin tetramethyl acrylate, pentaerythritol acrylate trimethyl, trimethylol-propane trimethacrylate, glycerol propoxylate trimethyl acrylic ester, tris(2-ethoxy) isocyanuric acid trimethyl acrylic ester, trimethylol-propane trimethacrylate, propoxylated trimethylol-propane trimethacrylate, ethoxylated trimethylolpropane trimethyl acrylic ester, pentaerythritol tetramethylacrylate, or a combination thereof.

One embodiment of the present disclosure provides a composition for a high-elasticity polymer comprising a liquid electrolyte solvent, a lithium salt, an initiator (to initiate the polymerization), and a mixed compound of a first compound and a second compound. The first compound may be an amine-based compound comprising polyethylene glycol as a functional group, and the second compound may be an epoxy-based compound.

The high-elasticity polymer may comprise oligomers represented by the following Chemical Formulae 1 and 2.

(Chemical Formula 1)

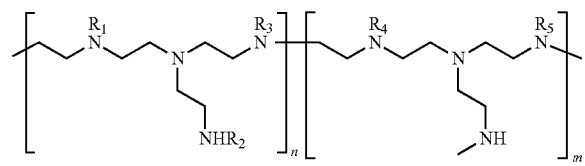

Herein, n and m are each an integer of 1 to 20, $R_1$ to $R_5$ are each independently hydrogen or $CO(CH_2)_3COO—(CH_2CH_2O)x-CH_3$, x is an integer of 1 to 100, and at least 3 or more of $R_1$ to $R_5$ are $CO(CH_2)_3COO—(CH_2CH_2O)_x CH_3$.

(Chemical Formula 2)

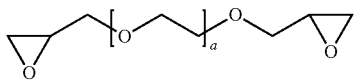

Herein, a is an integer of 1 to 100.

The first compound may specifically be polyimine comprising ethylene glycol, and examples thereof may include poly(ethylene imine)-graft-poly(ethylene glycol) (PEI-PEG) and the like. In addition, the second compound may be polyethylene glycol having two or more epoxy groups and examples thereof may include polyethylene diglycidyl ether and the like.

According to one embodiment of the present disclosure, a polymerizable monomer may be prepared by mixing the first compound and the second compound and reacting the mixture for 2 minutes to 12 hours in a temperature range of 30° C. to 100° C. Herein, the content ratio of a monomer having a functional group and a branched monomer may be from 1:18 to 1:75 in a weight ratio, but the ratio is not limited thereto.

Examples of the ionizable lithium salt in the composition for an electrolyte according to one embodiment of the present disclosure may include, but are not limited to, any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$ and $LiC_4BO_8$, or a mixture of two or more thereof.

In addition, as the liquid electrolyte solvent may be selected from those commonly used in liquid electrolytes for a lithium secondary battery. These include, for example, ether, ester, amide, linear carbonate, cyclic carbonate and the like. They may be used either alone or as a mixture of two or more thereof. Among these, carbonate compounds such as cyclic carbonate, linear carbonate or a mixture thereof may be typically used.

Specific examples of the cyclic carbonate compound may comprise any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and halides thereof, or a mixture of two or more types thereof. In addition, specific examples of the linear carbonate compound may comprise, but are not limited to, any one selected from the group consisting of dimethyl carbonate (DMC), diethyl carbonate (DEC), dipropyl carbonate (DPC), ethylmethyl carbonate (EMC), methylpropyl carbonate (MPC) and ethylpropyl carbonate (EPC), or a mixture of two or more thereof.

Particularly, among the carbonate-based liquid electrolyte solvents, propylene carbonate and ethylene carbonate that are cyclic carbonate may be preferably used since they are highly viscous organic solvents and have a high dielectric constant, and therefore, favorably dissociate lithium salts in a liquid electrolyte, and mixing low viscous and low dielectric constant linear carbonate such as ethylmethyl carbonate, diethyl carbonate or dimethyl carbonate to such cyclic carbonate in a proper ratio is more preferable since liquid electrolytes having high electric conductivity is capable of being prepared.

In addition, as the ester in the liquid electrolyte solvent, any one selected from the group consisting of methyl acetate, ethyl acetate, propyl acetate, methyl propionate, ethyl propionate, γ-butyrolactone, γ-valerolactone, γ-caprolactone, α-valerolactone and ε-caprolactone, or a mixture of two or more thereof may be used, however, the ester is not limited thereto.

Examples of crosslinked ether chains include 3-methoxysilyl-terminated polypropylene glycol (Chemical formula 3):

(Chemical Formula 3)

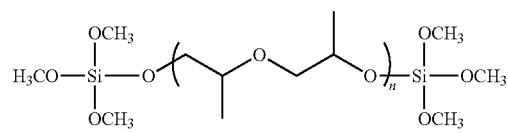

This polyether has three functional groups at each end that are capable of reacting with several different crosslinking agents. One of the crosslinking agents is lithium bis(oxalato)

borate (LiBOB), which is itself a lithium salt. One possible crosslinking reaction is shown below (Chemical Reaction No.)

(Chemical Reaction No. 1)

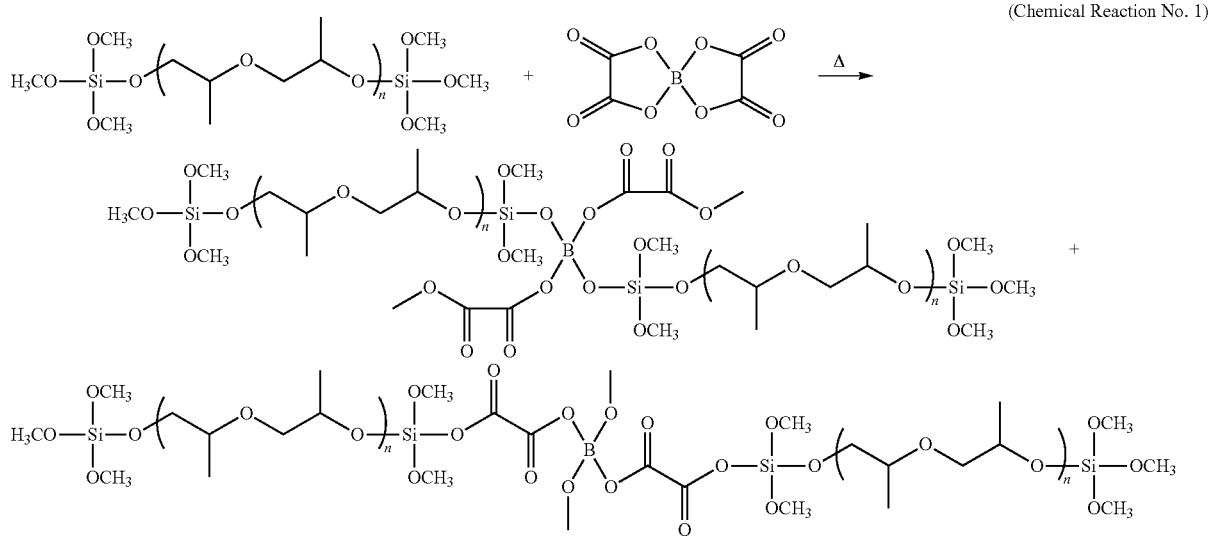

One can dissolve LiBOB and 3-methoxysilyl-terminated polypropylene glycol in an organic liquid mixture of propylene carbonate (PC) and acetone (as a volatile diluent) for up to 10% by weight concentration. The resulting solution (optionally with particles of an inorganic solid electrolyte and/or a flame retardant) is then cast onto a glass surface to form a layer. A desired amount of the solvent is then removed via vaporization. The resulting material is then cured at 35-70° C. for 15-200 minutes to obtain a cured polymer layer.

In a typical configuration, the elastic polymer protective layer is in ionic contact with both the anode and the cathode and typically in physical contact with an anode active material layer (or an anode current collector) and with a cathode active material layer.

In certain embodiments, the anode in the lithium secondary battery has an amount of lithium or lithium alloy as an anode active material supported by an anode current collector. In certain other embodiments, initially the anode has no lithium or lithium alloy as an anode active material supported by an anode current collector when the battery is made and prior to a charge or discharge operation of the battery. This latter configuration is referred to as an anode-less lithium battery.

In certain embodiments, the battery is a lithium-ion battery and the anode has an anode current collector and a layer of an anode active material supported by the anode current collector, which is in physical contact with the elastic flame-retardant composite separator. The anode active materials is selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobium oxide, lithium-containing titanium oxide, lithium transition metal oxide, $ZnCo_2O_4$; (f) carbon or graphite particles (g) prelithiated versions thereof; and (h) combinations thereof.

The current collector may be a Cu foil, a layer of Ni foam, a porous layer of nano-filaments, such as graphene sheets, carbon nanofibers, carbon nano-tubes, etc. forming a 3D interconnected network of electron-conducting pathways.

Preferably and most typically, this elastic polymer protective layer is different in composition than the working electrolyte used in the lithium battery and the elastic composite layer maintains as a discrete layer (not to be dissolved in the electrolyte).

We have discovered that this elastic polymer protective layer provides several unexpected benefits: (a) the formation and penetration of dendrite can be essentially eliminated; (b) uniform deposition of lithium back to the anode side is readily achieved during battery charging; (c) the layer ensures smooth and uninterrupted transport of lithium ions from/to the anode current collector surface (or the lithium film deposited thereon during the battery operations) and through the interface between the current collector (or the lithium film deposited thereon) and the elastic polymer protective layer with minimal interfacial resistance; (d) flame and fire-fighting capability is intrinsically built into the battery if a desired amount of flame-retardant additive is added into the high-elasticity layer; (e) reduced/eliminated electrolyte/lithium metal reactions; (e) reduced interfacial resistance at both the anode side and the cathode side; and (f) cycle stability can be significantly improved and cycle life increased. No additional protective layer for the lithium metal anode is required. The separator itself also plays the role as an anode protective layer.

In a conventional lithium metal cell, as illustrated in FIG. 1, the anode active material (lithium) is deposited in a thin film form or a thin foil form directly onto an anode current collector (e.g., a Cu foil) before this anode and a cathode are combined to form a cell. The battery is a lithium metal battery, lithium sulfur battery, lithium-selenium battery, etc. As previously discussed in the Background section, these lithium secondary batteries have the dendrite-induced internal shorting and "dead lithium" issues at the anode.

We have solved these challenging issues that have troubled battery designers and electrochemists alike for more than 30 years by developing and implementing a new elastic polymer protective layer disposed between the anode (an anode current collector or an anode active material layer) and a cathode active material layer. This elastic polymer protective layer comprises a high-elasticity polymer having a recoverable (elastic) tensile strain no less than 2% (preferably no less than 5%, and further preferably from 10% to 500%) under uniaxial tension and a lithium ion conductivity no less than $10^{-8}$ S/cm at room temperature (preferably and more typically from $1 \times 10^{-5}$ S/cm to $5 \times 10^{-2}$ S/cm).

Figure 2:
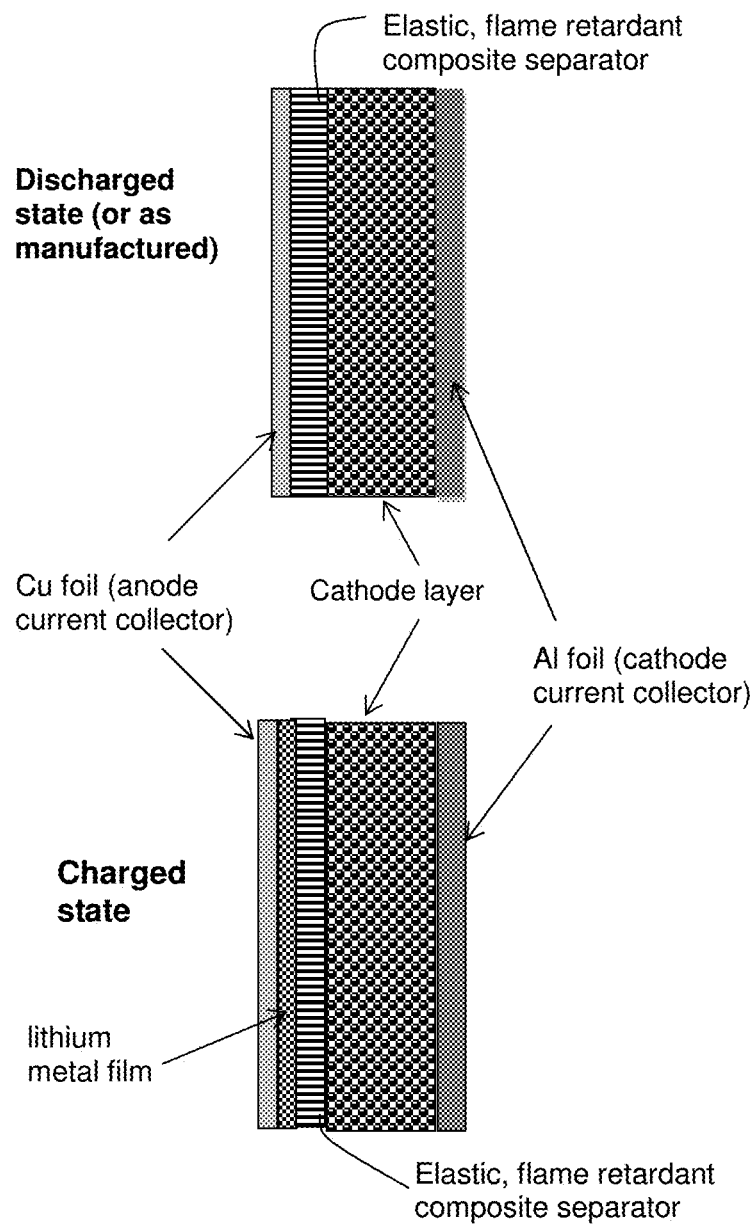
FIG. 2 Schematic of a presently invented lithium metal battery cell (upper diagram) containing an anode current collector (e.g., Cu foil) but no anode active material (when the cell is manufactured or in a fully discharged state), an elastic polymer protective layer (also serving as a separator), and a cathode active material layer, which is composed of particles of a cathode active material, a conductive additive (not shown) and a resin binder (not shown). A cathode current collector supporting the cathode active layer is also shown. The lower diagram shows a thin lithium metal layer deposited between the Cu foil and the elastic composite separator layer when the battery is in a charged state.

As schematically shown in FIG. 2, one embodiment of the present disclosure is a lithium metal battery or lithium-ion cell containing an anode current collector (e.g., Cu foil), a high-elasticity flame-retardant polymer composite-based protective layer (also serving as a separator), and a cathode active material layer, which is composed of particles of a cathode active material, a conductive additive (not shown) and a resin binder (not shown). A cathode current collector (e.g., Al foil) supporting the cathode active layer is also shown in FIG. 2.

The high-elasticity polymer material refers to a material (polymer or polymer composite) that exhibits an elastic deformation of at least 2% when measured under uniaxial tension. In the field of materials science and engineering, the "elastic deformation" is defined as a deformation of a material (when being mechanically stressed) that is essentially fully recoverable and the recovery is essentially instantaneous upon release of the load. The elastic deformation is preferably greater than 5%, more preferably greater than 10%, further more preferably greater than 30%, and still more preferably greater than 100% (up to 500%).

It may be noted that FIG. 2 shows a lithium battery that initially does not contain a lithium foil or lithium coating at the anode (only an anode current collector, such as a Cu foil or a graphene/CNT mat) when the battery is made. The needed lithium to be bounced back and forth between the anode and the cathode is initially stored in the cathode active material (e.g., lithium vanadium oxide $Li_xV_2O_5$, instead of vanadium oxide, $V_2O_5$; or lithium polysulfide, instead of sulfur). During the first charging procedure of such an anode-less lithium battery (e.g., as part of the electrochemical formation process), lithium comes out of the cathode active material, passes through the elastic composite separator and deposits on the anode current collector. The presence of the presently invented high-elasticity polymer protective layer or separator (in good contact with the current collector) enables the uniform deposition of lithium ions on the anode current collector surface. Such a battery configuration avoids the need to have a layer of lithium foil or coating being present during battery fabrication. Bare lithium metal is highly sensitive to air moisture and oxygen and, thus, is more challenging to handle in a real battery manufacturing environment. This strategy of pre-storing lithium in the lithiated (lithium-containing) cathode active materials, such as $Li_xV_2O_5$ and $Li_2S_x$, makes all the materials safe to handle in a real manufacturing environment. Cathode active materials, such as $Li_xV_2O_5$ and $Li_2S_x$, are typically not air-sensitive.

As the charging procedure continues, more lithium ions get to deposit onto the anode current collector, forming a lithium metal film or coating. During the subsequent discharge procedure, this lithium film or coating layer decreases in thickness due to dissolution of lithium into the electrolyte to become lithium ions, possibly creating a gap between the current collector and the separator layer if the separator layer were not elastic (e.g., a ceramic separator). Such a gap would make the re-deposition of lithium ions back to the anode impossible during a subsequent recharge procedure. We have observed that the presently invented elastic polymer protective layer is capable of expanding or shrinking congruently or conformably with the anode layer. This capability helps to maintain a good contact between the current collector (or the lithium film subsequently or initially deposited on the current collector surface) and the protective layer, enabling the re-deposition of lithium ions without interruption.

Figure 3A:
FIG. 3(A) Schematic of an elastic polymer protective layer wherein the flame retardant and/or inorganic solid electrolyte particles are uniformly dispersed in a matrix of high-elasticity polymer according to some embodiments of the present disclosure.
Figure 3B:
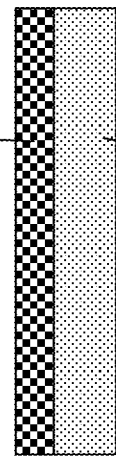
FIG. 3(B) Schematic of an elastic polymer protective layer wherein the flame retardant and/or inorganic solid electrolyte particles are preferentially dispersed near one surface (e.g. facing the anode side) of an elastic polymer protective layer; the opposing surface has a lower or zero concentration of the flame retardant and/or inorganic solid electrolyte particles, according to some embodiments of the present disclosure.

FIG. 3(A) schematically shows an elastic polymer protective layer wherein the flame retardant additive and the optional inorganic solid electrolyte particles are uniformly dispersed in a matrix of an elastic polymer according to some embodiments of the present disclosure. According to some other embodiments of the present disclosure, FIG. 3(B) schematically shows an elastic polymer composite layer wherein the flame retardant additive and/or inorganic solid electrolyte particles are preferentially dispersed near one surface (e.g. facing the anode side) of an elastic composite separator layer; the opposing surface has a lower or zero concentration of the inorganic solid electrolyte particles. This latter structure has the advantages that the high-concentration portion, being strong and rigid, provides a lithium dendrite-stopping capability while other portion of the layer remains highly elastic to maintain good contacts with neighboring layers (e.g., cathode active material layer containing a solid electrolyte on one side and lithium metal on the other) for reduced interfacial impedance. The elastic flame retardant composite separator also acts to retard the flame or fight any internal thermal runaway issue.

Flame-retardant additives are intended to inhibit or stop polymer pyrolysis and combustion processes by interfering with the various mechanisms involved-heating, ignition, and propagation of thermal degradation.

The flame retardant additive may be selected from a halogenated flame retardant, phosphorus-based flame retardant, melamine flame retardant, metal hydroxide flame retardant, silicon-based flame retardant, phosphate flame retardant, biomolecular flame retardant, or a combination thereof.

There is no limitation on the type of flame retardant that can be physically or chemically incorporated into the elastic polymer. The main families of flame retardants are based on compounds containing: Halogens (Bromine and Chlorine), Phosphorus, Nitrogen, Intumescent Systems, Minerals (based on aluminum and magnesium), and others (e.g., Borax, $Sb_2O_3$, and nanocomposites). Antimony trioxide is a good choice, but other forms of antimony such as the pentoxide and sodium antimonate may also be used.

One may use the reactive types (being chemically bonded to or becoming part of the polymer structure) and additive types (simply dispersed in the polymer matrix). For instance, reactive polysiloxane can chemically react with EPDM type elastic polymer and become part of the crosslinked network polymer. It may be noted that flame-retarding group modified polysiloxane itself is an elastic polymer composite containing a flame reatardant according to an embodiment of instant disclosure. Both reactive and additive types of flame retardants can be further separated into several different classes:
1) Minerals: Examples include aluminum hydroxide (ATH), magnesium hydroxide (MDH), huntite and hydromagnesite, various hydrates, red phosphorus and boron compounds (e.g. borates).

2) Organo-halogen compounds: This class includes organochlorines such as chlorendic acid derivatives and chlorinated paraffins; organobromines such as decabromodiphenyl ether (decaBDE), decabromodiphenyl ethane (a replacement for decaBDE), polymeric brominated compounds such as brominated polystyrenes, brominated carbonate oligomers (BCOs), brominated epoxy oligomers (BEOs), tetrabromophthalic anyhydride, tetrabromobisphenol A (TBBPA), and hexabromocyclododecane (HBCD).

3) Organophosphorus compounds: This class includes organophosphates such as triphenyl phosphate (TPP), resorcinol bis(diphenylphosphate) (RDP), bisphenol A diphenyl phosphate (BADP), and tricresyl phosphate (TCP); phosphonates such as dimethyl methylphosphonate (DMMP); and phosphinates such as aluminum diethyl phosphinate. In one important class of flame retardants, compounds contain both phosphorus and a halogen. Such compounds include tris(2,3-dibromopropyl) phosphate (brominated tris) and chlorinated organophosphates such as tris(1,3-dichloro-2-propyl) phosphate (chlorinated tris or TDCPP) and tetrakis(2-chlorethyl) dichloroisopentyldiphosphate (V6).

4) Organic compounds such as carboxylic acid and dicarboxylic acid

The mineral flame retardants mainly act as additive flame retardants and do not become chemically attached to the surrounding system (the polymer). Most of the organohalogen and organophosphate compounds also do not react permanently to attach themselves into the polymer. Certain new non halogenated products, with reactive and non-emissive characteristics have been commercially available as well.

In certain embodiments, the flame retardant additive is in a form of encapsulated particles comprising the additive encapsulated by a shell of coating material that is breakable or meltable when exposed to a temperature higher than a threshold temperature (e.g., flame or fire temperature induced by internal shorting). The encapsulating material is a substantially lithium ion-impermeable and liquid electrolyte-impermeable coating material. The encapsulating or micro-droplet formation processes that can be used to produce protected flame-retardant particles are briefly described below.

Several composite droplet forming processes require the encapsulating polymer or its precursor (monomer or oligomer) to be dissolvable in a solvent. Fortunately, there are a wide variety of polymers or their precursors used herein are soluble in some common solvents or water; water being the preferred liquid solvent. The un-cured polymer or its precursor can be readily dissolved in a common organic solvent or water to form a solution. This solution can then be used to embed, immerse, engulf or encapsulate the solid particles (e.g., flame retardant aluminum hydroxide particles and magnesium hydroxide particles) via several of the micro-droplet-forming methods to be discussed in what follows. Upon formation of the droplets, the polymer matrix is then polymerized and cross-linked.

There are three broad categories of micro-encapsulation methods that can be implemented to produce polymer-encapsulated flame retardant: physical methods, physico-chemical methods, and chemical methods. The physical methods include extrusion and pelletizing, solution dipping and drying, suspension coating or casting on a solid substrate (e.g. slot-die coating, Comma coating, spray-coating) followed by drying and scratching off particles from the substrate, pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

It may be noted that some of these methods (e.g. pan-coating, air-suspension coating, and spray-drying) may be used to coat or encapsulate particles by adjusting the solid content, degree of dispersion, spraying and drying conditions, etc.

Pan-coating method: The pan coating process involves tumbling the flame retardant particles in a pan or a similar device while the matrix material (e.g. monomer/oligomer liquid or uncured polymer/solvent solution; possibly containing a lithium salt dispersed or dissolved therein) is applied slowly until a desired amount of matrix is attained.

Air-suspension coating method: In the air suspension coating process, the solid particles are dispersed into the supporting air stream in an embedding chamber. A controlled stream of a reactive precursor solution (e.g. polymer or its monomer or oligomer dissolved in a solvent; or its monomer or oligomer alone in a liquid state) is concurrently introduced into this chamber, allowing the solution to hit and embed the suspended particles. These suspended particles are embedded in the reactive precursor (monomer, oligomer, etc. which is polymerized/cured concurrently or subsequently) while the volatile solvent is removed, leaving behind a composite comprising a matrix of conducting network polymer and anode active material particles. This process may be repeated several times until the required parameters, such as full embedding, are achieved. The air stream which supports the anode particles also helps to dry them, and the rate of drying is directly proportional to the temperature of the air stream, which can be adjusted for optimized polymer network amount.

In a preferred mode, the particles in the embedding zone portion may be subjected to re-circulation for repeated embedding. Preferably, the chamber is arranged such that the particles pass upwards through the embedding zone, then are dispersed into slower moving air and sink back to the base of the encapsulating chamber, enabling repeated passes of the particles through the embedding zone until the desired matrix amount is achieved.

Centrifugal extrusion: Additive particles may be embedded in a polymer network or precursor material using a rotating extrusion head containing concentric nozzles. In this process, a stream of core fluid (slurry containing additive particles dispersed in a solvent) is surrounded by a sheath of shell solution or melt containing the polymer or precursor. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational nozzle encapsulation method: matrix-encapsulation of particles can be conducted using a laminar flow through a nozzle and vibration of the nozzle or the liquid. The vibration has to be done in resonance with the Rayleigh instability, leading to very uniform droplets. The liquid can include any liquids with limited viscosities (1-50,000 mPa·s): emulsions, suspensions or slurry containing the anode active material particles and the polymer or precursor.

Spray-drying: Spray drying may be used to encapsulate and embed particles when the particles are suspended in a melt or polymer/precursor solution to form a suspension. In spray drying, the liquid feed (solution or suspension) is atomized to form droplets which, upon contacts with hot gas, allow solvent to get vaporized and a polymer matrix to fully embed the particles.

In-situ polymerization: In some micro-encapsulation processes, particles are fully embedded in a monomer or oligomer first. Then, direct polymerization of the monomer or oligomer is carried out with the presence of these material particles dispersed therein.

Matrix polymerization: This method involves dispersing and embedding solid particles in a polymeric matrix during formation of the particles. This can be accomplished via spray-drying, in which the particles are formed by evaporation of the solvent from the matrix material. Another possible route is the notion that the solidification of the matrix is caused by a chemical change.

The elastic polymer protective layer may comprise an inorganic filler dispersed in the high-elasticity polymer matrix wherein the inorganic filler is preferably selected from an oxide, carbide, boride, nitride, sulfide, phosphide, halogen compound, or selenide of a transition metal, Al, Ga, In, Sn, Pb, Sb, B, Si, Ge, Sb, or Bi, a lithiated version thereof, or a combination thereof. The transition metal is preferably selected from Ti, V, Cr, Mn, Fe, Co, Ni, Cu, Zn, Y, Zr, Nb, Mo, Pd, Ag, Cd, La, Ta, W, Pt, Au, Hg, a combination thereof. Particularly desired metal oxide particles include $Al_2O_3$ and $SiO_2$.

In certain preferred embodiments, the inorganic filler comprises fine particles of a solid-state electrolyte made into a powder form. Preferably, the inorganic solid electrolyte material (to be added into the elastic polymer protective layer as a lithium ion conductivity enhancer and a lithium dendrite stopper) is in a fine powder form having a particle size preferably from 10 nm to 30 μm (more preferably from 50 nm to 1 μm). The inorganic solid electrolyte material may be selected from an oxide type (e.g., perovskite-type), sulfide type, hydride type, halide type, borate type, phosphate type, lithium phosphorus oxynitride (LiPON), Garnet-type, lithium superionic conductor (LISICON), sodium superionic conductor (NASICON), or a combination thereof.

The inorganic solid electrolytes that can be incorporated into an elastic polymer protective layer include, but are not limited to, perovskite-type, NASICON-type, garnet-type and sulfide-type materials. A representative and well-known perovskite solid electrolyte is $Li_{3x}La_{2/3-x}TiO_3$, which exhibits a lithium-ion conductivity exceeding $10^{-3}$ S/cm at room temperature. This material has been deemed unsuitable in lithium batteries because of the reduction of $Ti^{4+}$ on contact with lithium metal. However, we have found that this material, when dispersed in an elastic polymer, does not suffer from this problem.

The sodium superionic conductor (NASICION)-type compounds include a well-known $Na_{1+x}Zr_2Si_xP_{3-x}O_{12}$. These materials generally have an $AM_2(PO_4)_3$ formula with the A site occupied by Li, Na or K. The M site is usually occupied by Ge, Zr or Ti. In particular, the $LiTi_2(PO_4)_3$ system has been widely studied as a solid state electrolyte for the lithium-ion battery. The ionic conductivity of $LiZr_2(PO_4)_3$ is very low, but can be improved by the substitution of Hf or Sn. This can be further enhanced with substitution to form $Li_{1+x}M_xTi_{2-x}(PO_4)_3$ (M=Al, Cr, Ga, Fe, Sc, In, Lu, Y or La). Al substitution has been demonstrated to be the most effective solid state electrolyte. The $Li_{1+x}Al_xGe_{2-x}(PO_4)_3$ system is also an effective solid state due to its relatively wide electrochemical stability window. NASICON-type materials are considered as suitable solid electrolytes for high-voltage solid electrolyte batteries.

Garnet-type materials have the general formula $A_3B_2Si_3O_{12}$, in which the A and B cations have eightfold and sixfold coordination, respectively. In addition to $Li_3M_2Ln_3O_{12}$ (M=W or Te), a broad series of garnet-type materials may be used as an additive, including $Li_5La_3M_2O_{12}$ (M=Nb or Ta), $Li_6ALa_2M_2O_{12}$ (A=Ca, Sr or Ba; M=Nb or Ta), $Li_{5.5}La_3M_{1.75}B_{0.25}O_{12}$ (M=Nb or Ta; B=In or Zr) and the cubic systems $Li_7La_3Zr_2O_{12}$ and $Li_{7.06}M_3Y_{0.06}Zr_{1.94}O_{12}$ (M=La, Nb or Ta). The $Li_{6.5}La_3Zr_{1.75}Te_{0.25}O_{12}$ compounds have a high ionic conductivity of $1.02\times10^{-3}$ S/cm at room temperature.

The sulfide-type solid electrolytes include the $Li_2S$—$SiS_2$ system. The highest reported conductivity in this type of material is $6.9\times10^{-4}$ S/cm, which was achieved by doping the $Li_2S$—$SiS_2$ system with $Li_3PO_4$. The sulfide type also includes a class of thio-LISICON (lithium superionic conductor) crystalline material represented by the $Li_2S$—$P_2S_5$ system. The chemical stability of the $Li_2S$—$P_2S_5$ system is considered as poor, and the material is sensitive to moisture (generating gaseous $H_2S$). The stability can be improved by the addition of metal oxides. The stability is also significantly improved if the $Li_2S$—$P_2S_5$ material is dispersed in an elastic polymer.

These solid electrolyte particles dispersed in an elastic polymer can help stop the penetration of lithium dendrites (if present) and enhance the lithium ion conductivity of certain elastic polymers having an intrinsically low ion conductivity.

Preferably and typically, the high-elasticity polymer has a lithium ion conductivity no less than $10^{-5}$ S/cm, more preferably no less than $10^{-4}$ S/cm, further preferably no less than $10^{-3}$ S/cm, and most preferably no less than $10^{-2}$ S/cm. The high-elasticity composite separator is a polymer matrix composite containing from 1% to 95% (preferably 10% to 85%) by weight of lithium ion-conducting solid electrolyte particles dispersed in or bonded by a high-elasticity polymer matrix material.

The high-elasticity polymer should have a high elasticity (elastic deformation strain value >2%). An elastic deformation is a deformation that is fully recoverable and the recovery process is essentially instantaneous (no significant time delay). The high-elasticity polymer can exhibit an elastic deformation from 5% up to 1,000% (10 times of its original length), more typically from 10% to 800%, and further more typically from 50% to 500%, and most typically and desirably from 70% to 300%. It may be noted that although a metal typically has a high ductility (i.e. can be extended to a large extent without breakage), the majority of the deformation is plastic deformation (non-recoverable) and only a small amount of elastic deformation (typically <1% and more typically <0.2%).

Typically, a high-elasticity polymer is originally in a monomer or oligomer states that can be cured to form a cross-linked polymer that is highly elastic. Prior to curing, these polymers or oligomers are soluble in an organic solvent to form a polymer solution. An ion-conducting or flame retardant additive may be added to this solution to form a suspension. This solution or suspension can then be formed into a thin layer of polymer precursor on a surface of an anode current collector. The polymer precursor (monomer or oligomer and initiator) is then polymerized and cured to form a lightly cross-linked polymer. This thin layer of polymer may be tentatively deposited on a solid substrate (e.g. surface of a polymer or glass), dried, and separated from the substrate to become a free-standing polymer layer. This free-standing layer is then laid on a lithium foil/coating or implemented between a lithium film/coating and electrolyte or separator. Polymer layer formation can be accomplished by using one of several procedures well-known in the art; e.g., spraying, spray-painting, printing, coating, extrusion-based film-forming, casting, etc.

It is essential for these materials to form a lightly cross-linked network of polymer chains. In other words, the network polymer or cross-linked polymer should have a relatively low degree of cross-linking or low cross-link density to impart a high elastic deformation.

The cross-link density of a cross-linked network of polymer chains may be defined as the inverse of the molecular weight between cross-links (Mc). The cross-link density can be determined by the equation, $Mc=\rho RT/Ge$, where Ge is the equilibrium modulus as determined by a temperature sweep in dynamic mechanical analysis, p is the physical density, R is the universal gas constant in J/mol*K and T is absolute temperature in K. Once Ge and p are determined experimentally, then Mc and the cross-link density can be calculated.

The magnitude of Mc may be normalized by dividing the Mc value by the molecular weight of the characteristic repeat unit in the cross-link chain or chain linkage to obtain a number, Nc, which is the number of repeating units between two cross-link points. We have found that the elastic deformation strain correlates very well with Me and Nc. The elasticity of a cross-linked polymer derives from a large number of repeating units (large Nc) between cross-links. The repeating units can assume a more relax conformation (e.g. random coil) when the polymer is not stressed. However, when the polymer is mechanically stressed, the linkage chain uncoils or gets stretched to provide a large deformation. A long chain linkage between cross-link points (larger Nc) enables a larger elastic deformation. Upon release of the load, the linkage chain returns to the more relaxed or coiled state. During mechanical loading of a polymer, the cross-links prevent slippage of chains that otherwise form plastic deformation (non-recoverable).

Preferably, the Nc value in a high-elasticity polymer is greater than 5, more preferably greater than 10, further more preferably greater than 100, and even more preferably greater than 200. These Nc values can be readily controlled and varied to achieve different elastic deformation values by using different cross-linking agents with different functionalities, and by designing the polymerization and cross-linking reactions to proceed at different temperatures for different periods of time.

Alternatively, Mooney-Rilvin method may be used to determine the degree of cross-linking. Crosslinking also can be measured by swelling experiments. In a swelling experiment, the crosslinked sample is placed into a good solvent for the corresponding linear polymer at a specific temperature, and either the change in mass or the change in volume is measured. The higher the degree of crosslinking, the less swelling is attainable. Based on the degree of swelling, the Flory Interaction Parameter (which relates the solvent interaction with the sample, Flory Huggins Eq.), and the density of the solvent, the theoretical degree of crosslinking can be calculated according to Flory's Network Theory. The Flory-Rehner Equation can be useful in the determination of cross-linking.

The high-elasticity polymer may contain a simultaneous interpenetrating network (SPIN) polymer, wherein two cross-linking chains intertwine with each other, or a semi-interpenetrating network polymer (semi-IPN), which contains a cross-linked polymer and a linear polymer.

The aforementioned high-elasticity polymers may be used alone to protect the lithium foil/coating layer at the anode. Alternatively, the high-elasticity polymer can be mixed with a broad array of elastomers, electrically conducting polymers, lithium ion-conducting materials, and/or strengthening materials (e.g., carbon nanotube, carbon nano-fiber, or graphene sheets).

A broad array of elastomers can be mixed with a high-elasticity polymer to form a blend, co-polymer, or interpenetrating network that encapsulates the cathode active material particles. The elastomeric material may be selected from natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

The urethane-urea copolymer film usually includes two types of domains, soft domains and hard ones. Entangled linear backbone chains including poly (tetramethylene ether) glycol (PTMEG) units constitute the soft domains, while repeated methylene diphenyl diisocyanate (MDI) and ethylene diamine (EDA) units constitute the hard domains. The lithium ion-conducting additive can be incorporated in the soft domains or other more amorphous zones.

In some embodiments, a high-elasticity polymer can form a polymer matrix composite containing a lithium ion-conducting additive dispersed in the high-elasticity polymer matrix material, wherein the lithium ion-conducting additive is selected from $Li_2CO_3$, $Li_2O$, $Li_2C_2O_4$, LiGH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq 1$, $1\leq y\leq 4$.

In some embodiments, the high-elasticity polymer can be mixed with a lithium ion-conducting additive, which contains a lithium salt selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroethyl-phosphate (LiPF$_3$(CF$_2$CF$_3$)$_3$), lithium bisperfluoro-ethylsulfonylimide (LiBETI), lithium bis(fluorosulfonyl)imide, an ionic liquid-based lithium salt, or a combination thereof.

In some embodiments, the high-elasticity polymer may form a mixture, co-polymer, semi-interpenetrating network, or simultaneous interpenetrating network with a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly(bis(2-(2-methoxyethoxy)ethoxy)phosphazene), Polyvinyl chloride, Polydimethylsiloxane, poly(vinylidene fluoride)-hexafluoropropylene (PVDF-HFP), a derivative thereof (e.g. sulfonated versions), or a combination thereof.

The presently invented lithium secondary batteries can contain a wide variety of cathode active materials. The cathode active material layer may contain a cathode active material selected from an inorganic material, an organic material, a polymeric material, or a combination thereof. The inorganic material may be selected from a metal oxide, metal phosphate, metal silicide, metal selenide, transition metal sulfide, or a combination thereof.

The inorganic cathode active material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

The cathode active material layer may contain a metal oxide containing vanadium oxide selected from the group consisting of Li$_x$VO$_2$, Li$_x$V$_2$O$_5$, Li$_x$V$_3$O$_8$, Li$_x$V$_3$O$_7$, Li$_x$V$_4$O$_9$, Li$_x$V$_6$O$_{13}$, their doped versions, their derivatives, and combinations thereof, wherein 0.1<x<5.

The cathode active material layer may contain a metal oxide or metal phosphate, selected from a layered compound LiMO$_2$, spinel compound LiM$_2$O$_4$, olivine compound LiMPO$_4$, silicate compound Li$_2$MSiO$_4$, Tavorite compound, borate compound LiMBO$_3$, or a combination thereof, wherein M is a transition metal or a mixture of multiple transition metals.

The electrolyte used in the lithium battery may be a liquid electrolyte, polymer gel electrolyte, solid-state electrolyte (including solid polymer electrolyte, inorganic electrolyte, and composite electrolyte), quasi-solid electrolyte, ionic liquid electrolyte.

The liquid electrolyte or polymer gel electrolyte typically comprises a lithium salt dissolved in an organic solvent or ionic liquid solvent. There is no particular restriction on the types of lithium salt or solvent that can be used in practicing the present disclosures.

Some particularly useful lithium salts are lithium perchlorate (LiCO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$S$_{03}$), bis-trifluoromethyl sulfonylimide lithium (LiN(CF$_3$S$_{02}$)$_2$), lithium bis(oxalato)borate (LiBOB), lithium oxalyldifluoroborate (LiBF$_2$C$_{204}$), lithium nitrate (LiNO$_3$), Li-fluoroethyl-phosphate (LiPF$_3$(CF$_2$CF$_3$)$_3$), lithium bisperfluoro-ethylsulfonylimide (LiBETI), lithium bis(fluorosulfonyl)imide, an ionic liquid-based lithium salt, or a combination thereof.

There are a wide variety of processes that can be used to produce layers of elastic polymer protective layers. These include coating, casting, painting, spraying (e.g., ultrasonic spraying), spray coating, printing (screen printing, 3D printing, etc.), tape casting, etc.

In certain embodiments, the process for manufacturing elastic polymer protective layers comprises (A) dispersing the optional flame retardant additive and optional particles of the inorganic solid electrolyte particles in a liquid reactive mass of an elastic polymer precursor to form a slurry; (B) dispensing and depositing a layer of the liquid reactive mass or slurry onto a solid substrate surface; and (C) polymerizing and/or curing the reactive mass to form a layer of elastic polymer.

The solid substrate may be an anode current collector, an anode active material layer, or a cathode active material layer. In other words, this elastic composite separator can be directly deposited onto a layer of anode active material, an anode current collector, or a layer of cathode active material. This is achievable because curing of the high-elasticity polymer does not require a high temperature; curing temperature typically lower than 200° C. or even lower than 100° C. This is in stark contrast to the typically 900-1,200° C. required of sintering an inorganic solid electrolyte to form a ceramic separator. In addition, the presently disclosed elastic separator is at least as good as a ceramic separator in terms of reducing interfacial impedance and stopping dendrite penetration.

Preferably, the process is a roll-to-roll process wherein step (B) comprises (i) continuously feeding a layer of the solid substrate (e.g. flexible metal film, plastic film, etc.) from a feeder roller to a dispensing zone where the reactive mass is dispensed and deposited onto the solid substrate to form a continuous layer of the reactive mass; (ii) moving the layer of the reactive mass into a reacting zone where the reactive mass is exposed to heat, ultraviolet (UV) light, or high-energy radiation to polymerize and/or cure the reactive mass to form a continuous layer of elastic polymer; and (iii) collecting the elastic polymer on a winding roller. This process is conducted in a reel-to-reel manner.

Figure 4:
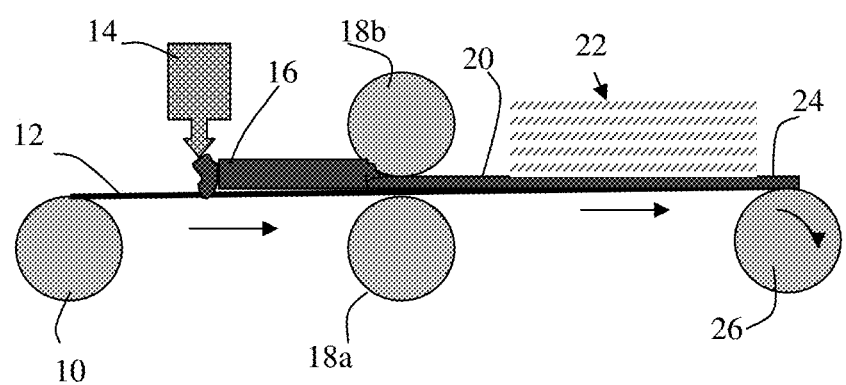
FIG. 4 Schematic of a roll-to-roll process for producing rolls of elastic composite separator in a continuous manner.

In certain embodiments, as illustrated in FIG. 4, the roll-to-roll process may begin with continuously feeding a solid substrate layer 12 (e.g., PET film) from a feeder roller 10. A dispensing device 14 is operated to dispense and deposit a reactive mass 16 (e.g., reactive slurry) onto the solid substrate layer 12, which is driven toward a pair of rollers (18a, 18b). These rollers are an example of a provision to regulate or control the thickness of the reactive mass 20. The reactive mass 20, supported on the solid substrate, is driven to move through a reacting zone 22 which is provided with a curing means (heat, UV, high energy radiation, etc.). The partially or fully cured polymer composite 24 is collected on a winding roller 26. One may unwind the roll at a later stage.

The process may further comprise cutting and trimming the layer of elastic polymer into one or multiple pieces of elastic polymer protective layers.

The process may further comprise combining an anode, the elastic polymer protective layer, an electrolyte, and a cathode electrode to form a lithium battery.

The lithium battery may be a lithium metal battery, lithium-ion battery, lithium-sulfur battery, lithium-selenium battery, lithium-air battery, etc. The cathode active material in the lithium-sulfur battery may comprise sulfur or lithium polysulfide.

Example 1: Anode-Less Lithium Battery Containing an Elastic Polymer Protective Layer Based on Poly(2-Hydroxyethyl Acrylate) Copolymers (with or without an Additional Separator)

An elastic polymer protective layer was obtained from a water-soluble and rigid-soft modulated co-polymer, poly (acrylic acid)-poly(2-hydroxyethyl acrylate-co-dopamine methacrylate) (denoted PAA-P (HEA-co-DMA) hereafter), which can be cured to form multiple crosslinked network structures.

For the synthesis of DMA, as an example, 10 g of sodium borate and 4 g of $NaHCO_3$ were dissolved in 100 ml of deionized water and bubbled with Ar for 20 min. Then, 10 g of dopamine HCl (26.4 mmol) was added, followed by dropwise addition of 4.7 ml of methacrylate anhydride (29.1 mmol) in 25 ml of THF during which the pH of solution was kept above 8 with addition of 1 M NaOH as necessary. The reaction mixture was stirred overnight at room temperature with Ar bubbling. The aqueous mixture was washed twice with 50 ml of ethyl acetate and then the pH of the aqueous solution was reduced to less than 2 and extracted with 50 ml of ethyl acetate three times. The final three ethyl acetate layers were combined and dried over $MgSO_4$ to reduce the volume to around 30 ml. Subsequently, 250 ml of hexane was added with vigorous stirring and the suspension was held at 4° C. overnight. The product was recrystallized from hexane and dried to yield 4.0 g of grey solid powder, DMA.

For the synthesis of p(DMA-co-HEA), 5.22 g of purified HEA (43.1 mmol), 0.66 g of DMA (2.87 mmol), and 76 mg of azobisisobutyronitrile (AIBN, 0.46 mmol) were added to 20 ml of DMF in an airtight flask. The solution mixture was degassed through pump-freeze-thaw cycles three times. While sealed under vacuum, the solution was heated to 60° C. and stirred overnight. The reaction mixture was diluted with 50 ml of methanol and added to 400 ml of Et2O to precipitate the polymer. After precipitating in DCM/Et2O two more times and drying in the vacuum desiccator, 3.5 g of white, sticky solid, P(HEA-co-DMA), was obtained. Poly(acrylic acid) and P(HEA-co-DMA) were dissolved in a mixture of methanol and water and the resulting solution was coated onto a Cu foil surface. The liquid mixture was removed by heat and the resulting mixture was heat-treated at 70-80° C. to induce the desired crosslinking between chemical functional groups.

In some samples, a desired amount of selected flame retardant (e.g., aluminum hydroxide and a phosphorus compound, Chemical Formula 4 below, available from Amfine Chemical Corp.) was added to the reacting mass to produce flame-retardant elastic polymer protective layer.

(Chemical Formula 4)

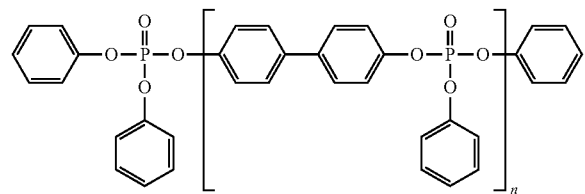

On a separate basis, some amount of the Poly(acrylic acid) and P(HEA-co-DMA) solution was cast onto a glass surface to form a wet film, which was thermally dried and then cured under similar conditions to form a film of cross-linked polymer. In this experiment, the Poly(acrylic acid)-to-P (HEA-co-DMA) weight ratio was varied from 2/8 to 5/2 to vary the degree of cross-linking in several different polymer films. Some of the cured polymer samples were subjected to dynamic mechanical testing to obtain the equilibrium dynamic modulus, $G_e$, for the determination of the number average molecular weight between two cross-link points ($M_c$) and the corresponding number of repeat units ($N_c$), as a means of characterizing the degree of cross-linking.

Several tensile testing specimens were cut from each cross-linked film and tested with a universal testing machine. The representative tensile stress-strain curves indicate that this series of network polymers have an elastic deformation from approximately 28% (high PAA content) to 415%. These above are for neat polymers without any additive.

For electrochemical testing, the working electrodes (cathode layers) were prepared by mixing 85 wt. % $LiV_2O_5$ or 88% of graphene-embraced $LiV_2O_5$ particles, 5-8 wt. % CNTs, and 7 wt. % polyvinylidene fluoride (PVDF) binder dissolved in N-methyl-2-pyrrolidinoe (NMP) to form a slurry of 5 wt. % total solid content. After coating the slurries on Al foil, the electrodes were dried at 120° C. in vacuum for 2 h to remove the solvent before pressing. Then, the electrodes were cut into a disk ($\phi$=12 mm) and dried at 100° C. for 24 h in vacuum.

Electrochemical measurements were conducted on cells that are initially lithium metal-free and cells that contain a lithium foil. In the former cells (anode-less cells), a Cu foil coated with an elastic polymer protective layer, a porous PE-PP separator, and a cathode layer were combined to form a cell, which was injected with an electrolyte solution containing 1 M $LiPF_6$ dissolved in a mixture of ethylene carbonate (EC) and diethyl carbonate (DEC) (EC-DEC, 1:1 v/v). The cell assembly was performed in an argon-filled glove-box. For comparison purposes, cells with the conventional Celgard 2400 membrane (porous PE-PP film) as a separator, but no elastic polymer protective layer, were also prepared. The CV measurements were carried out using a CH-6 electrochemical workstation at a scanning rate of 1-100 mV/s. The electrochemical performance of the cell featuring the elastic composite separator and that containing a conventional separator were evaluated by galvanostatic charge/discharge cycling at a current density of 50 mA/g using an Arbin electrochemical workstation.

The specific intercalation capacity curves of two lithium cells each having a cathode containing $LiV_2O_5$ particles (one cell having a flame retardant-filled cross-linked polymer-based separator and the other having no protection, just a conventional separator) were obtained and compared. As the number of cycles increases, the specific capacity of the un-protected cells drops at a very fast rate. In contrast, the presently invented cross-linked polymer-based protection layer provides the battery cell with a significantly more stable and high specific capacity for a large number of cycles. These data have demonstrated the surprising and superior performance of the presently invented cross-linked polymer protection approach.

The high-elasticity cross-linked polymer protective layer appears to be capable of reversibly deforming to a great extent without breakage when the lithium foil decreases in thickness during battery discharge. The elastic polymer protective layer also prevents the continued reaction between liquid electrolyte and lithium metal at the anode, reducing the problem of continuing loss in lithium and electrolyte. This also enables a significantly more uniform deposition of lithium ions upon returning from the cathode during a battery re-charge; hence, no lithium dendrite.

Example 2: High-Elasticity Polymer Protective Layer from a Copolymer Comprising of Pendant Poly(Ethylene Oxide) (PEO) Segments and Ureido-Pyrimidinone (UPy) Quadruple Hydrogen Bonding Moieties in an Anode-Less Cell Poly(ethylene glycol) methyl ether methacrylate, 4-cyano-4-(phenylcarbonothioylthio) pentanoic acid, 2,2'- azobis(2-methylpropionitrile) (AIBN, 98%) were commercially available. The synthesis of UPy monomer (2-(3-(6-Methyl-4-oxo-1,4-dihydropyrimidin-2-yl)ureido) ethyl methacrylate) (UPyMA) was described in Long's method [S. Liu, et al. *J. Mater. Chem. B* 2017, 5, 2671-2678].

RAFT copolymerization of PEGMA and UPyMA was conducted by following the below procedure: Briefly, 5.07 g of PEGMA, 0.56 g of UPyMA, 14 mg of 4-cyano-4-(phenylcarbonothioylthio)pentanoic acid and 8 mg of 2,2'-azobis(2-methylpropionitrile) were dissolved in 20 mL of DMF in a round-bottom flask. Afterwards, the flask was sealed with a rubber septum and purged with nitrogen for 20 min to remove oxygen. The reaction was allowed to proceed in an oil bath at 60° C. for 16 h. After the reaction, the mixture was cooled down in an icy water bath and the polymer was dialyzed against deionized water and freeze-dried to yield purified rubbery polymer (PEO-UPy) or cast onto a glass surface to form a thin film. The RAFT polymerization of PEGMA was conducted in a similar manner, but without adding UPyMA monomer; the produced polymer poly(PEGMA) was termed as PEO.

LiPEO-UPy gel polymer was synthesized as follows: The PEO-UPy polymer was dissolved in THF, and then Li chips were added into the polymer solution under magnetic stirring overnight. After filtering, casting on a glass surface, and solvent evaporation, a film of LiPEO-UPy gel polymer was obtained. The polymer color was found to become brownish yellow from pink.

Films of PEO-UPy, PEO, and LiPEO-UPy gel polymer were separately used as a protective layer in an anode-less lithium cell. In other cells (initially with or without a lithium metal foil), these films were used alone as a separator (without any additional separator, such as porous PE-PP copolymer or ceramic separator). This reduces the battery weight and volume, resulting in a further increase in energy densities.

In some samples, a desired amount of a flame retardant (e.g. decabromodiphenyl ethane (DBDPE), brominated poly (2,6-dimethyl-1,4-phenylene oxide) (BPPO), and melamine-based flame retardant, separately; the latter from Italmatch Chemicals) was then added into the solution.

In several samples, a garnet-type solid electrolyte ($Li_7La_3Zr_2O_{12}$ (LLZO)) powder was also added into the solution. Subsequently, these solutions were separately cast to form a thin layer of precursor reactive mass onto a Cu foil. The precursor reactive mass was then heated at a temperature from 75 to 100° C. for 2 to 8 hours to obtain a layer of high-elasticity polymer composite adhered to the Cu foil surface.

Electrochemical testing results show that the cell having an anode-protecting polymer composite layer offers a significantly more stable cycling behavior. The high-elasticity polymer appears to act to isolate the liquid electrolyte from the subsequently deposited lithium coating, preventing continued reaction between the liquid electrolyte and lithium metal.

Example 3: Li Metal Cells Containing Ionic Bond-Crosslinked Network Polymer-Based Protective Layer Several elastic polymer protective layers were obtained from dicationic polymer ionic liquids (PILs), poly(4-vinylpyridine)(propyl-trimethylammonium) (PVT) as an electrolyte backbone. In the electrolytes, the interspace among PVT chain segments was filled with 1-ethyl-3-methylimidazolium bis(trifluoro-methanesulfonyl)imide (EMIMTFSI) ionic liquid (IL) and lithium salt (LiTFSI) to form composite electrolyte layers. In a typical fabrication, PVT polymers, LiTFSI salts and EMIMTFSI ionic liquid were dissolved in acetone to form a PVT-acetone solution. The solution was dropped on a polyethylene terephthalate (PET) template, and was subsequently purged in nitrogen to remove acetone solvent, resulting in a PVT-EMIMTFSI composite electrolyte membrane.

In some samples, a flame retardant (e.g., triphenylphosphate (TPP) and "Phoslite", a phosphorus compound from Italmatch Chemicals) was dispersed in the elastic polymer, prior to being cast onto a lithium metal layer pre-deposited on a Cu foil surface.

Commercially available NCM-532 powder (well-known lithium nickel cobalt manganese oxide), along with graphene sheets (as a conductive additive), was then added into an NMP and PVDF binder suspension to form a multiple-component slurry. The slurry was then slurry-coated on Al foil and dried to form cathode layers.

An Al foil-supported cathode active layer, an elastic protective layer (essentially a flame retardant polymer composite separator), and a Cu foil-supported lithium metal foil were then assembled into a lithium metal cell, followed by an electrolyte injection procedure.

Example 4: Li Metal Cells Containing a Crosslinked Polyurethane Acrylate Network-Based Elastic Polymer Protective Layer A crosslinked polymer network of polyurethane acrylate (PUA) was invested as a potential elastic polymer protective layer material. PUA was synthesized from propylene oxide and ethylene oxide random copolymer and used as an oligomer for GPE. The precursor for GPE was prepared using PUA as a macromonomer, tri(ethylene glycol) dimethacrylate (TEGDMA) as a reactive modifier, benzoyl peroxide (BPO) as a thermal initiator and 1.0 M $LiPF_6$/EC-DEC (1:1 vol %) as the electrolyte.

More specifically, the PUA was synthesized by an additional reaction of a polyol and a diisocyanate. A polyol (Mw=2000) was dehydrated under reduced pressure at 80° C. for 24 h before use. The polyol was a random copolymer of propylene oxide and ethylene oxide. Hydrogenized 4,4'-dicyclohexylmethane diisocyanate (HMDI) was obtained from Aldrich and used as received. The prepolymer was prepared by allowing the mixture of HMDI and the polyol to react at 60° C. for 2 h by stirring under a dried nitrogen blanket to obtain NCO-terminated urethane prepolymer. After the prepolymer was synthesized, its contents of NCO groups were characterized with a dibutyl amine back titration method. Further, the required amount of hydroxyethyl acrylate (HEA) was slowly added to the NCO-terminated prepolymer. The reaction was allowed to continue for 3 h to obtain growing oligomers of urethane-HEA and then it was terminated by the addition of small amounts of methanol.

A curable mixture included a macromonomer, a reactive modifier, and an initiator. This mixture can be cured alone to obtain a solid polymer electrolyte, or in the presence of a liquid electrolyte to obtain a gel polymer electrolyte. A precursor for a gel polymer electrolyte (to be made into an elastic polymer layer) included a liquid electrolyte, a macromonomer (urethane-HEA), a reactive modifier, and an initiator. A battery grade solution of 1.0 M $LiPF_6$/EC-DEC (1:1 vol %) was used as a liquid electrolyte. TEGDMA was used as a reactive modifier to improve the mechanical properties of the gel polymer electrolyte. BPO ($C_{14}H_{10}O_4$, Aldrich Chemical Co.) was used as a thermal initiator. All procedures for preparing the precursor were carried out in a dry box filled with argon gas. The resulting reactive mixtures were cast onto a glass surface to form layers of reactive mass. The reactive mass was cured at 60-115° C. for 1-6 hours.

Several tensile testing specimens were cut from each cross-linked film and tested with a universal testing machine. The representative tensile stress-strain curves indicate that this series of network polymers have an elastic deformation from approximately 25% to 120%.

Desired amounts of a flame retardant (aluminum hydroxide and magnesium hydroxide), along with some desired particles of a solid inorganic electrolyte, were then added into the solution to form slurry samples. The slurry samples were slot-die coated on a PET plastic substrate to form layers of sulfonated elastomer composite. These flame retardants were found to have insignificant impact on the lithium ion conductivity.

Example 5: Elastic Polymer Protective Layer from Oligomeric Polyether Electrolyte Cross-Linked Poly(Methyl Methacrylate) (PMMA)

The high-elasticity polymer layer for protecting a lithium metal anode was based Poly(ethylene glycol) dimethyl ether (PEDGME) (molecular weight=250, 400, referred to as PEDGME250 and PEDGME400, respectively), methyl methacrylate (MMA), ethylene glycol dimethacrylate (EGD), benzoyl peroxide (BPO) and lithium triflate ($LiCF_3SO_3$). The lithium imide salt ($LiN(CF_3SO_2)_2$) and the lithium BETI salt ($LiN(CF_3CF_2SO_2)_2$) were dried under dynamic vacuum at 90° C. for 24 h before use. PEGDME was dried under dynamic vacuum overnight and then stored over activated molecular sieves for more than 24 h in an Ar-circulating glove-box before use. Li Salt/PEGDME solutions (1 M) were prepared inside the glove-box by stirring overnight. The concentration of lithium salt in PEGDME was 1.0 M for all the PGEs reported in this study, which corresponds to a $Li^+$/ether oxygen ratio of about 1:20. The monomers for the polymerization reaction, MMA and EGD, were passed through de-inhibition columns to remove the hydroquinone inhibitor. Then a monomer mixture, 98% MMA and 2% EGD by weight, was stored over activated molecular sieves in a refrigerator for more than 24 h prior to polymerization.

Separately, the reacting mass was cast onto a glass surface to form several films which were cured to obtain cross-linked polymers having different degrees of cross-linking. Tensile testing was also conducted on these films. This series of cross-linked polymers can be elastically stretched up to approximately 35% (higher degree of cross-linking) to 422% (lower degree of cross-linking).

In several samples, a desired amount of a selected flame retardant additive (aluminum hydroxide) was added into the reactive mass to produce flame-retardant protective layers.

Example 6: Preparation of Solid Electrolyte Powder, Lithium Nitride Phosphate Compound (LIPON)

Particles of $Li_3PO_4$ (average particle size 4 m) and urea were prepared as raw materials; 5 g each of $Li_3PO_4$ and urea was weighed and mixed in a mortar to obtain a raw material composition. Subsequently, the raw material composition was molded into 1 cm×1 cm×10 cm rod with a molding machine, and the obtained rod was put into a glass tube and evacuated. The glass tube was then subjected to heating at 500° C. for 3 hours in a tubular furnace to obtain a lithium nitride phosphate compound (LIPON). The compound was ground in a mortar into a powder form. These particles can be added into a polymer composite matrix.

Example 7: Preparation of Solid Electrolyte Powder, Lithium Superionic Conductors with the $Li_{10}GeP_2S_{12}$ (LGPS)-Type Structure The starting materials, $Li_2S$ and $SiO_2$ powders, were milled to obtain fine particles using a ball-milling apparatus. These starting materials were then mixed together with $P_2S_5$ in the appropriate molar ratios in an Ar-filled glove box. The mixture was then placed in a stainless steel pot, and milled for 90 min using a high-intensity ball mill. The specimens were then pressed into pellets, placed into a graphite crucible, and then sealed at 10 Pa in a carbon-coated quartz tube. After being heated at a reaction temperature of 1,000° C. for 5 h, the tube was quenched into ice water. The resulting solid electrolyte material was then subjected to grinding in a mortar to form a powder sample to be later added as an inorganic solid electrolyte particles dispersed in an intended elastic polymer matrix.

Example 8: Preparation of Garnet-Type Solid Electrolyte Powder

The synthesis of the c-$Li_{6.25}Al_{0.25}La_3Zr_2O_{12}$ was based on a modified sol-gel synthesis-combustion method, resulting in sub-micron-sized particles after calcination at a temperature of 650° C. (J. van den Broek, S. Afyon and J. L. M. Rupp, Adv. Energy Mater., 2016, 6, 1600736).

For the synthesis of cubic garnet particles of the composition c-$Li_{6.25}Al_{0.25}La_3Zr_2O_{12}$, stoichiometric amounts of $LiNO_3$, $Al(NO_3)_3$-$9H_2O$, $La(NO_3)_3$-$6(H_2O)$, and zirconium (IV) acetylacetonate were dissolved in a water/ethanol mixture at temperatures of 70° C. To avoid possible Li-loss during calcination and sintering, the lithium precursor was taken in a slight excess of 10 wt % relative to the other precursors. The solvent was left to evaporate overnight at 95° C. to obtain a dry xerogel, which was ground in a mortar and calcined in a vertical tube furnace at 650° C. for 15 h in alumina crucibles under a constant synthetic airflow. Calcination directly yielded the cubic phase c-$Li_{6.25}Al_{0.25}La_3Zr_2O_{12}$, which was ground to a fine powder in a mortar for further processing.

The c-$Li_{6.25}Al_{0.25}La_3Zr_2O_{12}$ solid electrolyte pellets with relative densities of ~87±3% made from this powder (sintered in a horizontal tube furnace at 1070° C. for 10 h under $O_2$ atmosphere) exhibited an ionic conductivity of ~0.5× $10^{-3}$ S cm$^{-1}$ (RT). The garnet-type solid electrolyte with a composition of c-$Li_{6.25}Al_{0.25}La_3Zr_2O_{12}$ (LLZO) in a powder form was dispersed in several electric, ion-conducting polymers discussed earlier.

Example 9: Preparation of Sodium Superionic Conductor (NASICON) Type Solid Electrolyte Powder The $Na_{3.1}Zr_{1.95}M_{0.05}Si_2PO_{12}$ (M=Mg, Ca, Sr, Ba) materials were synthesized by doping with alkaline earth ions at octahedral 6-coordination Zr sites. The procedure employed includes two sequential steps. Firstly, solid solutions of alkaline earth metal oxides (MO) and $ZrO_2$ were synthesized by high energy ball milling at 875 rpm for 2 h. Then NASICON $Na_{3.1}Zr_{1.95}M_{0.05}Si_2PO_{12}$ structures were synthesized through solid-state reaction of $Na_2CO_3$, $Zr_{1.95}M_{0.05}O_{3.95}$, $SiO_2$, and $NH_4H_2PO_4$ at 1260° C.

We claim:

1. A lithium secondary battery comprising a cathode, an anode, and an elastic polymer protective layer disposed between the cathode and the anode, and a working electrolyte in ionic communication with the anode and the cathode, wherein said elastic polymer protective layer comprises a high-elasticity polymer having a thickness from 2 nm to 100 μm, a lithium ion conductivity from $10^{-8}$ S/cm to $5\times10^{-2}$ S/cm at room temperature, and a fully recoverable tensile elastic strain from 2% to 1,000% when measured without any additive or filler dispersed therein and wherein said high-elasticity polymer comprises at least a crosslinked polymer network of chains derived from at least one multi-functional monomer or oligomer selected from, polyether, polyurethane acrylate, tetraethylene glycol diacrylate, triethylene glycol dimethacrylate, di(trimethylolpropane) tetraacrylate, a derivative thereof, or a combination thereof, wherein a multi-functional monomer or oligomer comprises at least three reactive functional groups and wherein said crosslinked polymer network of chains is impregnated with from 0% to 90% by weight of a liquid electrolyte.

2. The lithium secondary battery of claim 1, wherein said high-elasticity polymer layer comprises chains selected from 3-methoxysilyl-terminated polypropylene glycol, pendant poly(ethylene oxide) (PEO) segments, an amine-based compound comprising polyethylene glycol as a functional group, polyethylene glycol having two or more epoxy groups, poly(ethylene glycol) methyl ether acrylate (PEGA), (2-(3-(6-methyl-4-oxo-1,4-dihydropyrimidin-2-yl)ureido) ethyl methacrylate) (UPyMA), poly[propylene oxide-co-2-(2-methoxyethoxy)ethyl glycidyl ether] (P(PO/EM), poly(2-hydroxyethyl acrylate), poly(dopamine methacrylate), poly (2-hydroxyethyl acrylate-co-dopamine methacrylate) (P(HEA-co-DMA), or a combination thereof, wherein (i) the battery is a lithium metal battery and the anode has an anode current collector but initially the anode has no lithium or lithium alloy as an anode active material supported by said anode current collector when the battery is made and prior to a charge or discharge operation of the battery; (ii) the high-elasticity polymer layer serves as a separator and there is no additional separator in the battery; or (iii) the high-elasticity polymer further comprises a flame-retardant additive or particles of an inorganic solid electrolyte.

3. The lithium secondary battery of claim 1, wherein said high-elasticity polymer further comprises from 0.1% to 95% by weight of a flame retardant additive, an inorganic filler, or both that is dispersed in, dissolved in, or chemically bonded to the high-elasticity polymer.

4. The lithium secondary battery of claim 1, further comprising an ion-conducting and electrically insulating separator disposed between the elastic polymer protective layer and the cathode.

5. The lithium secondary battery of claim 1, wherein the battery is a lithium metal battery and the anode has an anode current collector but initially the anode has no lithium or lithium alloy as an anode active material supported by said anode current collector when the battery is made and prior to a charge or discharge operation of the battery.

6. The lithium secondary battery of claim 1, wherein the battery is a lithium metal battery and the anode has an anode current collector and an amount of lithium or lithium alloy as an anode active material supported by said anode current collector.

7. The lithium secondary battery of claim 1, wherein the battery is a lithium-ion battery and the anode has an anode current collector and a layer of an anode active material supported by said anode current collector, wherein the anode active materials is selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium aluminate, lithium-containing titanium oxide, lithium transition metal oxide, $ZnCo_2O_4$; (f) carbon or graphite particles (g) prelithiated versions thereof; and (h) combinations thereof.

8. The lithium secondary battery of claim 1, wherein said elastic polymer protective layer is in physical contact with an anode current collector or an anode active material layer to protect said anode current collector or said anode active material layer.

9. The lithium secondary battery of claim 1, wherein said elastic polymer protective layer is a separator that electrically isolates the anode and the cathode and in ionic communication with an anode current collector or an anode active material layer and a cathode active material layer.

10. The lithium secondary battery of claim 1, further comprising a separator layer disposed between the elastic polymer protective layer and the cathode.

11. The lithium secondary battery of claim 1, wherein said cathode comprises particles of a cathode active material and a conductive additive that are dispersed in or bonded by a high-elasticity polymer that comprises at least a crosslinked polymer network of chains derived from at least one multi-functional monomer or oligomer selected from a polyether, polyurethane acrylate, tetraethylene glycol diacrylate, triethylene glycol dimethacrylate, or di(trimethylolpropane) tetraacrylate, wherein a multi-functional monomer or oligomer comprises at least three reactive functional groups.

12. The lithium secondary battery of claim 1, wherein said anode comprises particles of an anode active material and a conductive additive that are dispersed in or bonded by a high-elasticity polymer that comprises at least a crosslinked polymer network of chains derived from at least one multi-functional monomer or oligomer selected from a polyether, polyurethane acrylate, tetraethylene glycol diacrylate, triethylene glycol dimethacrylate, or di(trimethylolpropane) tetraacrylate, wherein a multi-functional monomer or oligomer comprises at least three reactive functional groups.

13. The lithium secondary battery of claim 3, wherein said flame retardant additive is selected from a halogenated flame retardant, phosphorus-based flame retardant, melamine flame retardant, metal hydroxide flame retardant, silicon-based flame retardant, biomolecular flame retardant, or a combination thereof.

14. The lithium secondary battery of claim 3, wherein said flame retardant additive is in a form of encapsulated particles comprising the additive encapsulated by a shell of a substantially lithium ion-impermeable and liquid electrolyte-impermeable coating material, wherein said shell is breakable when exposed to a temperature higher than a threshold temperature.

15. The lithium secondary battery of claim 1, wherein said working electrolyte is selected from an organic liquid electrolyte, ionic liquid electrolyte, polymer gel electrolyte, solid-state electrolyte, quasi-solid electrolyte having a lithium salt dissolved in an organic or ionic liquid with a lithium salt concentration higher than 2.0 M, hybrid or composite electrolyte, or a combination thereof.

16. The lithium secondary battery of claim 3, wherein said inorganic filler is selected from an oxide, carbide, boride, nitride, sulfide, phosphide, halogen compound, or selenide of a transition metal, Al, Ga, In, Sn, Pb, Sb, B, Si, Ge, Sb, or Bi, a lithiated version thereof, or a combination thereof.

17. The lithium secondary battery of claim 3, wherein said inorganic filler is selected from an inorganic solid electrolyte material in a fine powder form having a particle size from 2 nm to 30 μm.

18. The lithium secondary battery of claim 17, wherein said particles of an inorganic solid electrolyte material selected from an oxide type, sulfide type, hydride type, halide type, borate type, phosphate type, lithium phosphorus oxynitride (LiPON), garnet-type, lithium superionic conductor (LISICON) type, or a combination thereof.

19. The lithium secondary battery of claim 1, wherein said high-elasticity polymer further comprises an elastomer that forms a mixture, a copolymer, a semi-interpenetrating network, or a simultaneous interpenetrating network with said high-elasticity polymer wherein said elastomer is selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) elastomer, poiy(ethylene-co-butene) elastomer, styrene-ethylene-butadiene-styrene elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polysiloxane, polyurethane, urethane-urea copolymer, urethane-acrylic copolymer, a copolymer thereof, a sulfonated version thereof, or a combination thereof.

20. The lithium secondary battery of claim 1, wherein said high-elasticity polymer further comprises from 0.1% to 30% by weight of a lithium ion-conducting additive.

21. The lithium secondary battery of claim 20, wherein said lithium ion-conducting additive comprises a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoromethanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroethyl-phosphate ($LiPF_3(CF_2CF_3)_3$), lithium bisperfluoro-ethylsulfonylimide (LiBETI), lithium bis(fluorosulfonyl)imide, an ionic liquid-based lithium salt, or a combination thereof.

22. The lithium secondary battery of claim 1, wherein the high-elasticity polymer forms a mixture, a blend, a copolymer, a semi-interpenetrating network, or a simultaneous interpenetrating network with a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly(bis(2-(2-methoxyethoxy)ethoxy)phosphazene), Polyvinyl chloride, Polydimethylsiloxane, poly(vinylidene fluoride)-hexafluoropropylene (PVDF-HFP), a sulfonated derivative thereof, or a combination thereof.

23. The lithium secondary battery of claim 1, wherein said cathode comprises a cathode active material selected from an inorganic material, an organic material, a polymeric material, or a combination thereof.

24. The lithium secondary battery of claim 23, wherein said inorganic material, as a cathode active material, is selected from sulfur, selenium, a metal oxide, metal phosphate, metal silicide, metal selenide, metal sulfide, or a combination thereof.

25. The lithium secondary battery of claim 23, wherein said inorganic material is selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

26. The lithium secondary battery of claim 23, wherein said inorganic material is selected from a lithium transition metal silicate, denoted as $Li_2MSiO_4$ or $Li_2Ma_xMb_ySiO_4$, wherein M and Ma are selected from Fe, Mn, Co, Ni, or V; Mb is selected from Fe, Mn, Co, Ni, V, Ti, Al, B, Sn, or Bi; and x+y≤1.

27. The lithium secondary battery of claim 24, wherein said metal oxide or metal phosphate is selected from a layered compound $LiMO_2$, spinel compound $LiM_2O_4$, olivine compound $LiMPO_4$, silicate compound $Li_2MSiO_4$, Tavorite compound, borate compound $LiMBO_3$, or a combination thereof, wherein M is a transition metal or a mixture of multiple transition metals.

28. The rechargeable lithium cell of claim 23, wherein the cathode active material comprises lithium nickel manganese oxide ($LiNi_aMn_{2-a}O_4$, 0<a<2), lithium nickel manganese cobalt oxide ($LiNi_nMn_mCo_{1-n-m}O_2$, 0<n<1, 0<m<1, n+m<1), lithium nickel cobalt aluminum oxide ($LiNi_cCo_dAl_{1-c-d}O_2$, 0<c<1, 0<d<1, c+d<1), lithium manganese ($LiMn_2O_4$), lithium iron phosphate ($LiFePO_4$), lithium manganese oxide ($LiMnO_2$), lithium cobalt oxide ($LiCoO_2$), lithium nickel cobalt oxide ($LiNi_pCo_{1-p}O_2$, 0<p<1), or lithium nickel manganese oxide ($LiNi_qMn_{2-q}O_4$, 0<q<2).

29. An elastic and flame retardant composite layer, wherein said elastic and flame retardant composite comprises a high-elasticity polymer and from 0.1% to 95% by weight of a flame retardant additive dispersed in, dissolved in, or chemically bonded to the high-elasticity polymer, wherein said elastic composite separator has a thickness from 10 nm to 100 μm and a lithium ion conductivity from $10^{-8}$ S/cm to $5 \times 10^{-2}$ S/cm at room temperature and said high elasticity polymer has a fully recoverable tensile strain from 2% to 1,000% when measured without any additive dispersed therein and wherein said high-elasticity polymer comprises at least a crosslinked polymer network of chains derived from at least one multi-functional monomer or oligomer selected from a polyether, polyurethane acrylate, tetraethylene glycol diacrylate, triethylene glycol dimethacrylate, or di(trimethylolpropane) tetraacrylate, wherein a multi-functional monomer or oligomer comprises at least three reactive functional groups.

* * * * *